(12) United States Patent
Shan et al.

(10) Patent No.: US 11,405,977 B2
(45) Date of Patent: Aug. 2, 2022

(54) RESOURCE CONFIGURATION METHOD AND DEVICE

(71) Applicant: HUAWEI TECHNOLOGIES CO., LTD., Guangdong (CN)

(72) Inventors: Baokun Shan, Beijing (CN); Yinghui Yu, Beijing (CN); Odile Rollinger, Cambridge (GB)

(73) Assignee: Huawei Technologies Co., Ltd., Shenzhen (CN)

( * ) Notice: Subject to any disclaimer, the term of this patent is extended or adjusted under 35 U.S.C. 154(b) by 262 days.

(21) Appl. No.: 16/786,022

(22) Filed: Feb. 10, 2020

(65) Prior Publication Data

US 2020/0178344 A1 Jun. 4, 2020

Related U.S. Application Data

(63) Continuation of application No. PCT/CN2017/096934, filed on Aug. 10, 2017.

(51) Int. Cl.
*H04W 76/27* (2018.01)
*H04W 76/28* (2018.01)
(Continued)

(52) U.S. Cl.
CPC .......... *H04W 76/27* (2018.02); *H04L 1/0003* (2013.01); *H04L 1/1887* (2013.01);
(Continued)

(58) Field of Classification Search
CPC .............. H04W 76/27; H04W 72/042; H04W 72/1289; H04W 76/28; H04L 1/0003; H04L 1/1887
See application file for complete search history.

(56) References Cited

U.S. PATENT DOCUMENTS

2012/0155316 A1  6/2012 Li et al.
2013/0016604 A1  1/2013 Ko et al.
(Continued)

FOREIGN PATENT DOCUMENTS

CN  101925106 A  12/2010
CN  102036305 A  4/2011
(Continued)

OTHER PUBLICATIONS

Ericsson, "Semi-persistent scheduling for NB-IoT",3GPP Draft; R1-1706889, XP051272120, May 14, 2017, 3 pages.
(Continued)

*Primary Examiner* — Kyaw Z Soe
(74) *Attorney, Agent, or Firm* — Fish & Richardson P.C.

(57) ABSTRACT

Example resource configuration methods and devices are described. One example resource configuration method includes applying to a network device for semi-persistent scheduling by a terminal device. The terminal device receives configuration information sent by the network device, where the configuration information is used to configure a first semi-persistent scheduling resource for the terminal device. The terminal device configures the first semi-persistent resource for the terminal device based on the configuration information, and sends uplink data to the network device on the first semi-persistent scheduling resource.

17 Claims, 10 Drawing Sheets

(51) Int. Cl.
*H04L 1/00* (2006.01)
*H04L 1/18* (2006.01)
*H04W 72/04* (2009.01)
*H04W 72/12* (2009.01)

(52) U.S. Cl.
CPC ..... *H04W 72/042* (2013.01); *H04W 72/1289* (2013.01); *H04W 76/28* (2018.02)

(56) References Cited

U.S. PATENT DOCUMENTS

| | | | |
|---|---|---|---|
| 2013/0142125 A1 | 6/2013 | Shimezawa et al. | |
| 2013/0188591 A1 | 7/2013 | Ko et al. | |
| 2013/0343305 A1* | 12/2013 | Kwon | H04W 72/0426 370/329 |
| 2018/0184439 A1* | 6/2018 | Lee | H04W 72/0413 |

FOREIGN PATENT DOCUMENTS

| | | |
|---|---|---|
| CN | 102065516 A | 5/2011 |
| CN | 103313254 A | 9/2013 |
| CN | 104640159 A | 5/2015 |
| CN | 105992378 A | 10/2016 |
| CN | 106455095 A | 2/2017 |
| CN | 106535348 A | 3/2017 |
| EP | 2182763 A1 | 5/2010 |
| EP | 3179659 A2 | 6/2017 |
| WO | 2016000209 A1 | 1/2016 |
| WO | 2016208962 A1 | 12/2016 |

OTHER PUBLICATIONS

Extended European Search Report issued in European Application No. 17920852.2 dated Jun. 18, 2020, 10 pages.

EPO Communication pursuant to Article 94(3) EPC issued in European Application No. 17920852.5 dated Apr. 26, 2021, 7 pages.

Office Action issued in Chinese Application No. 201780090833.3 dated Dec. 1, 2020, 8 pages.

PCT International Search Report and Written Opinion in International Application No. PCT/CN2017/096,934, dated Apr. 28, 2018, 15 pages (With English Translation).

Office Action issued in Chinese Application No. 202110292368.X dated May 19, 2022, 9 pages.

* cited by examiner

RESOURCE CONFIGURATION METHOD AND DEVICE

CROSS-REFERENCE TO RELATED APPLICATIONS

This application is a continuation of International Application No. PCT/CN2017/096934, filed on Aug. 10, 2017, the disclosure of which is hereby incorporated by reference in its entirety.

TECHNICAL FIELD

This application relates to the field of communications technologies, and in particular, to a resource configuration method and a device.

BACKGROUND

A narrowband internet of things (narrow band internet of things, NB-IoT) system is constructed in a cellular network, may occupy a minimum bandwidth of approximately 180 kHz, and may be directly deployed in a global system for mobile communications (global system for mobile communication, GSM) system, a universal mobile telecommunications system (universal mobile telecommunications system, UMTS), or a long term evolution (long term evolution, LTE) system, to reduce deployment costs and implement a smooth upgrade.

Currently, to meet requirements such as low costs and deep coverage, an NB-IoT system has many special designs. For example, the NB-IoT system has no physical uplink control channel (physical uplink control channel, PUCCH) channel, to simplify a terminal device and reduce costs. Correspondingly, because NB-IoT has no PUCCH, the terminal device cannot be supported in applying for an uplink resource on a PUCCH by using a scheduling request (scheduling request, SR). When the terminal device needs to send uplink data, the terminal device can apply for the uplink resource only in a random access process, and consequently power consumption is relatively high. In addition, if the terminal device needs to transmit a relatively large amount of data, a base station needs to send a physical downlink control channel (physical downlink control channel, PDCCH) to each transport block (transport block, TB) to schedule the uplink resource. In this way, network resources are definitely wasted due to a large quantity of PDCCHs.

In this case, the foregoing problem may be resolved through semi-persistent scheduling (semi-persistent scheduling, SPS). However, an SPS mechanism in a conventional long term evolution (Long Term Evolution, LTE) system is mainly designed for a voice service in the LTE system. To be specific, the base station may determine, based on quality of service (Quality of Service, QoS) of a service, whether the service is a voice service. If the service is a voice service, the base station determines that SPS can be configured for the service.

However, if an SPS application scenario in the NB-IoT system is not for a voice service, the base station may not determine whether SPS needs to be configured. In this case, a dynamic scheduling manner is used. It can be learned from the foregoing descriptions that resources are wasted due to the dynamic scheduling manner.

SUMMARY

Embodiments of this application provide a resource configuration method and a device, to reduce a resource waste.

According to a first aspect, a resource configuration method is provided. The method may be performed by a terminal device. The method includes: applying, by a terminal device, to a network device for semi-persistent scheduling; receiving, by the terminal device, configuration information sent by the network device, where the configuration information is used to configure a first semi-persistent scheduling resource for the terminal device; configuring, by the terminal device, the first semi-persistent resource for the terminal device based on the configuration information; and sending, by the terminal device, uplink data to the network device on the first semi-persistent scheduling resource.

According to a second aspect, a resource configuration method is provided. The method may be performed by a network device, and the network device is, for example, a base station. The method includes: determining, by a network device, that a terminal device applies for semi-persistent scheduling; sending, by the network device, configuration information to the terminal device, where the configuration information is used to configure a first semi-persistent scheduling resource for the terminal device; and receiving, by the network device on the first semi-persistent scheduling resource, uplink data sent by the terminal device.

In this embodiment of this application, the terminal device applies to the network device for semi-persistent scheduling. Therefore, after receiving the application from the terminal device, the network device may configure semi-persistent scheduling for the terminal device, and the network device does not need to determine whether semi-persistent scheduling needs to be configured for the terminal device, so that a configuration result better meets a requirement of the terminal device. This can also reduce a resource waste caused by a dynamic scheduling manner used because the network device cannot determine whether semi-persistent scheduling needs to be configured.

In a possible design, before the terminal device applies to the network device for semi-persistent scheduling, the terminal device receives a broadcast message sent by the network device. The broadcast message is used to indicate that the network device supports semi-persistent scheduling; or the broadcast message is used to indicate a random access resource reserved by the network device for the terminal device to apply for semi-persistent scheduling. Correspondingly, before the network device determines that the terminal device applies for semi-persistent scheduling, the network device sends the broadcast message. The broadcast message is used to indicate that the network device supports semi-persistent scheduling; or the broadcast message is used to indicate the random access resource reserved by the network device for the terminal device to apply for semi-persistent scheduling.

The network device may send the broadcast message in advance, to notify the terminal device that the network device supports semi-persistent scheduling, or directly indicate the random access resource reserved by the network device for the terminal device to apply for semi-persistent scheduling, in other words, implicitly notify the terminal device that the network device supports semi-persistent scheduling, so that the terminal device can apply to the network device for semi-persistent scheduling, to prevent the terminal device from failing to apply.

In a possible design, the applying, by a terminal device, to a network device for semi-persistent scheduling includes: when the broadcast message is used to indicate that the network device supports semi-persistent scheduling, sending, by the terminal device, semi-persistent scheduling request information to the network device by using first radio resource control RRC signaling, where the semi-persistent scheduling request information is used to apply for semi-persistent scheduling; or when the broadcast message is used to indicate the random access resource reserved by the network device for the terminal device to apply for semi-persistent scheduling, sending, by the terminal device, a random access preamble to the network device by using a first random access resource in the reserved random access resource. Correspondingly, the determining, by a network device, that a terminal device applies for semi-persistent scheduling includes: when the broadcast message is used to indicate that the network device supports semi-persistent scheduling, determining, by the network device, that semi-persistent scheduling request information sent by the terminal device is received by using first RRC signaling, where the semi-persistent scheduling request information is used to apply for semi-persistent scheduling; or when the broadcast message is used to indicate the random access resource reserved by the network device for the terminal device to apply for semi-persistent scheduling, determining, by the network device, that a random access preamble sent by the terminal device is received by using a first random access resource in the reserved random access resource.

Because the broadcast message broadcast by the network device has different indication manners, the terminal device may apply to the network device for semi-persistent scheduling in different manners based on the different indication manners, so that the manner is relatively flexible. When the broadcast message explicitly indicates that the network device supports semi-persistent scheduling, the terminal device may explicitly apply for semi-persistent scheduling directly by using the first RRC signaling, so that the method is relatively simple and direct. When the broadcast message is used to indicate the random access resource reserved by the network device for the terminal device to apply for semi-persistent scheduling, the terminal device sends the random access preamble directly by using the reserved random access resource, so that the network device can know that the terminal device applies for semi-persistent scheduling. In this way, random access is performed, and semi-persistent scheduling is also applied for.

In a possible design, when the broadcast message is used to indicate that the network device supports semi-persistent scheduling, and the broadcast message is further used to indicate a coverage level that is of semi-persistent scheduling and that is supported by the network device, the terminal device determines, based on a coverage level of the terminal device and the coverage level that is of semi-persistent scheduling and that is supported by the network device, whether to apply for semi-persistent scheduling. Alternatively, when the broadcast message is used to indicate the random access resource reserved by the network device for the terminal device to apply for semi-persistent scheduling, and the broadcast message is further used to indicate a coverage level that is of semi-persistent scheduling and that corresponds to the reserved random access resource, the terminal device determines, based on a coverage level of the terminal device and a coverage level that is of semi-persistent scheduling and that corresponds to the reserved random access resource, whether to apply for semi-persistent scheduling. Correspondingly, when the broadcast message is used to indicate that the network device supports semi-persistent scheduling, the broadcast message is further used to indicate a coverage level that is of semi-persistent scheduling and that is supported by the network device. Alternatively, when the broadcast message is used to indicate the random access resource reserved by the network device for the terminal device to apply for semi-persistent scheduling, the broadcast message is further used to indicate a coverage level that is of semi-persistent scheduling and that corresponds to the reserved random access resource. The coverage level is used by the terminal device to determine, based on the coverage level of the terminal device, whether to apply for semi-persistent scheduling.

If the broadcast message may be used to indicate the coverage level that is of semi-persistent scheduling and that is supported by the network device (the coverage level that is of semi-persistent scheduling and that corresponds to the reserved random access resource is also the coverage level that is of semi-persistent scheduling and that is supported by the network device), the terminal device can determine the coverage level of the terminal device, so that the terminal device can determine, based on the coverage level that is of semi-persistent scheduling and that is supported by the network device and the coverage level of the terminal device, whether to apply for semi-persistent scheduling. For example, if the coverage level that is of semi-persistent scheduling and that is supported by the network device includes the coverage level of the terminal device, the terminal device can apply for semi-persistent scheduling. However, if the coverage level that is of semi-persistent scheduling and that is supported by the network device does not include the coverage level of the terminal device, the terminal device cannot apply for semi-persistent scheduling. Therefore, the coverage level that is of semi-persistent scheduling and that is supported by the network device is broadcast, so that the terminal device can determine whether semi-persistent scheduling can be applied for. If semi-persistent scheduling cannot be applied for, the terminal device may apply for semi-persistent scheduling without a need to consume resources, to help reduce overheads, and also reduce a failure rate of applying for semi-persistent scheduling.

In a possible design, the receiving, by the terminal device, configuration information sent by the network device includes: receiving, by the terminal device, second RRC signaling sent by the network device, where the second RRC signaling carries the configuration information; and the configuration information is further used to activate the first semi-persistent scheduling resource. Correspondingly, the sending, by the network device, configuration information to the terminal device includes: sending, by the terminal device, second RRC signaling to the network device, where the second RRC signaling carries the configuration information; and the configuration information is further used to activate the first semi-persistent scheduling resource.

The configuration information may be sent by using RRC signaling, and the configuration information may be used to activate the first semi-persistent scheduling resource, so that there is no need to specially activate the first semi-persistent scheduling resource again, to reduce an execution step. In addition, in an LTE system, a PDCCH is further required for activating a configured semi-persistent scheduling resource. In this case, the terminal device needs to listen on the PDCCH to implement activation of the semi-persistent scheduling resource. However, in this embodiment of this application, the configuration information is sent by using the RRC signaling without a need to use the PDCCH. Therefore, the terminal device does not need to listen on the PDCCH, to reduce power consumption of the terminal device.

In a possible design, the configuration information is used to indicate at least one of a scheduling period of the first semi-persistent resource, a quantity of repeated transmission times, a modulation and coding scheme used on the first semi-persistent scheduling resource, and a transport block size used on the first semi-persistent scheduling resource; and the quantity of repeated transmission times is used to indicate a quantity of times of repeated transmission on the first semi-persistent scheduling resource.

The parameters that may be included in the configuration information are described above by using an example. In addition, in this embodiment of this application, the configuration information may further include the quantity of repeated transmission times, to help implement different coverage levels of semi-persistent scheduling.

In a possible design, the terminal device may further receive first indication information sent by the network device by using media access control signaling, and the first indication information is used to indicate that scheduling of the first semi-persistent scheduling resource is stopped. Correspondingly, the network device may further send first indication information to the terminal device by using media access control signaling, and the first indication information is used to indicate that scheduling of the first semi-persistent scheduling resource is stopped.

To be specific, in addition to configuring the first semi-persistent scheduling resource for the terminal device, the network device may stop scheduling the first semi-persistent scheduling resource. In this embodiment of this application, the network device uses the media access control signaling to indicate that scheduling of the first semi-persistent scheduling resource is stopped, and does not need to use a PDCCH for indication. Therefore, the terminal device does not need to continuously listen on the PDCCH, to help reduce power consumption of the terminal device.

In a possible design, the terminal device may further receive second indication information sent by the network device by using third RRC signaling. The second indication information is used to configure a second semi-persistent scheduling resource for the terminal device, or the second indication information is used to release the first semi-persistent scheduling resource; and the second semi-persistent scheduling resource is used by the terminal device to send uplink data to the network device. Correspondingly, the network device may further send second indication information to the terminal device by using third RRC signaling. The second indication information is used to configure and activate a second semi-persistent scheduling resource for the terminal device, or the second indication information is used to release the first semi-persistent scheduling resource; and the second semi-persistent scheduling resource is used by the terminal device to send uplink data to the network device.

To be specific, in addition to configuring the first semi-persistent scheduling resource for the terminal device, the network device may reconfigure a new semi-persistent scheduling resource, namely, the second semi-persistent scheduling resource; or may release the first semi-persistent scheduling resource. In this embodiment of this application, the network device uses RRC signaling to indicate that the new semi-persistent scheduling resource is reconfigured or the first semi-persistent scheduling resource is released, and does not need to use a PDCCH for indication. Therefore, the terminal device does not need to continuously listen on the PDCCH, to help reduce power consumption of the terminal device.

According to a third aspect, a method for configuring DCI is provided. The method may be performed by a network device, and the network device is, for example, a base station. The method includes: sending, by the network device, DCI format information, where the DCI format information is used to indicate a DCI format used by the network device, and the DCI is used to schedule at least two transport blocks; and sending, by the network device, the DCI to a terminal device.

According to a fourth aspect, a method for configuring DCI is provided. The method may be performed by a terminal device. The method includes: receiving, by the terminal device, DCI format information sent by a network device, where the DCI format information is used to indicate a DCI format used by the network device, and the DCI is used to schedule at least two transport blocks; receiving, by the terminal device, the DCI sent by the network device; and receiving, by the terminal device based on scheduling of the DCI, downlink data sent by the network device.

In this embodiment of this application, the DCI indicated by the DCI format information can be used to schedule the at least two transport blocks, so that semi-persistent scheduling is implemented after the DCI is used. System overheads for sending DCI to each transport block in a network are reduced, and power consumption of listening to a plurality of pieces of DCI by the terminal device is also reduced.

In a possible design, the sending, by the network device, DCI format information includes: sending, by the network device through a single cell multimedia broadcast multicast service control channel, first DCI format information used on a single cell multimedia broadcast multicast service traffic channel. Correspondingly, the receiving, by the terminal device, DCI format information sent by a network device includes: receiving, by the terminal device through a single cell multimedia broadcast multicast service control channel, first DCI format information that is sent by the network device and that is used on a single cell multimedia broadcast multicast service traffic channel.

This is a scenario in which the terminal device is in an idle mode. In this scenario, data is transmitted between the network device and the terminal device through the single cell multimedia broadcast multicast service control channel and the single cell multimedia broadcast multicast service traffic channel. Therefore, the network device may send, through the single cell multimedia broadcast multicast service control channel, the first DCI format information used on the single cell multimedia broadcast multicast service traffic channel, to configure a new DCI format.

In a possible design, the sending, by the network device, DCI format information further includes: broadcasting, by the network device, second DCI format information used on the single cell multimedia broadcast multicast service control channel. Correspondingly, the receiving, by the terminal device, DCI format information sent by a network device further includes: receiving, by the terminal device, second DCI format information that is broadcast by the network device and that is used on the single cell multimedia broadcast multicast service control channel.

In a scenario in which the terminal device is in an idle mode, data is transmitted between the network device and the terminal device through the single cell multimedia broadcast multicast service control channel and the single cell multimedia broadcast multicast service traffic channel. Therefore, the network device may also configure a new DCI format for the single cell multimedia broadcast multicast service control channel.

In a possible design, before the network device sends the DCI format information, the network device obtains capability information of the terminal device and/or DCI format information supported by a service performed by the network device. The capability information of the terminal device is used to indicate whether the terminal device supports the DCI format. In this case, the sending, by the network device, DCI format information includes: sending, by the network device, the DCI format information when the capability information of the terminal device indicates that the terminal device supports the DCI format, or when the service performed by the network device supports the DCI format.

To be specific, the network device may determine in advance the capability information of the terminal device or the DCI format information supported by the service performed by the network device, to determine whether a service performed by the terminal device or the network device supports a new DCI format, so that the network device sends the DCI format information again when the service performed by the terminal device or the network device supports the new DCI format, to avoid confusion or a fault caused because the service performed by the terminal device or the network device does not support the DCI format.

In a possible design, that the network device obtains capability information of the terminal device includes: receiving, by the network device, the capability information of the terminal device that is sent by the terminal device; obtaining, by the network device, the capability information of the terminal device in a random access process of the terminal device; or receiving, by the network device, the capability information of the terminal device that is sent by a core network device. Correspondingly, the terminal device further sends the capability information of the terminal device to the network device.

The network device may obtain the capability information of the terminal device in a plurality of different manners, so that the manner is relatively flexible. The network device may select any one of the manners based on a specific situation to obtain the capability information of the terminal device.

In a possible design, the network device may further send first indication information to the terminal device. The first indication information is used to indicate that application of the DCI format is suspended, or used to indicate that a new DCI format is enabled. Correspondingly, the terminal device may further receive first indication information sent by the network device. The first indication information is used to indicate that application of the DCI format is suspended, or used to indicate that a new DCI format is enabled.

It may be indicated that in addition to using the DCI format, the network device may enable the new DCI format, or suspend applying the DCI format, to meet different requirements.

According to a fifth aspect, an RRC connection release method is provided. The method may be performed by a terminal device. The method includes: receiving, by the terminal device, first media access control signaling sent by a network device, where the first media access control signaling is used to instruct the terminal device to release the RRC connection to the network device; and releasing, by the terminal device, the RRC connection based on the first media access control signaling.

According to a sixth aspect, an RRC connection release method is provided. The method may be performed by a network device, and the network device is, for example, a base station. The method includes: sending, by the network device, first media access control signaling to a terminal device, where the first media access control signaling is used to instruct the terminal device to release the RRC connection to the network device; and receiving, by the network device, an ACK or a NACK sent by the terminal device, where the ACK is used to indicate that the RRC connection is successfully released, and the NACK is used to indicate that the RRC connection fails to be released.

The network device uses MAC signaling (namely, the first media access control signaling) to instruct the terminal device to release the RRC connection, instead of using RRC signaling for instruction. Therefore, the terminal device does not need to send an RRC status report to the network device. The ACK/NACK is MAC layer signaling, an uplink resource required by the MAC layer signaling is scheduled by the network device, and the terminal device may directly use the uplink resource without a need to apply for scheduling again. It can be learned that after the technical solution in this embodiment of this application is used, the terminal device does not need to apply to the network device for the uplink resource again, so that power consumption of the terminal device is reduced, and an entire procedure can also be simplified.

In a possible design, after the releasing, by the terminal device, the RRC connection based on the media access control signaling, the method further includes: sending, by the terminal device, the ACK or the NACK to the network device, where the ACK is used to indicate that the RRC connection is successfully released, and the NACK is used to indicate that the RRC connection fails to be released.

In a possible design, the terminal device may further send capability information of the terminal device to the network device. The capability information of the terminal device is used to indicate whether the terminal device supports to use the media access control signaling to instruct to release the RRC connection. Correspondingly, the network device may further receive capability information of the terminal device that is sent by the terminal device. The capability information of the terminal device is used to indicate whether the terminal device supports to use the media access control signaling to instruct to release the RRC connection. In this case, the sending, by the network device, first media access control signaling to a terminal device includes: sending, by the network device, the first media access control signaling to the terminal device when the capability information of the terminal device indicates that the terminal device supports to use the media access control signaling to instruct to release the RRC connection.

If the terminal device may send the capability information of the terminal device to the network device, the network device may determine, based on the capability information of the terminal device, whether the terminal device supports to use the media access control signaling to instruct to release the RRC connection. If the terminal device supports to use the media access control signaling to instruct to release the RRC connection, the network device may use the media access control signaling to instruct the terminal device to release the RRC connection. However, if the terminal device does not support to use the media access control signaling to instruct to release the RRC connection, the network device does not use the media access control signaling to instruct the terminal device to release the RRC connection, for example, the network device may continue to use the RRC signaling to instruct the terminal device to release the RRC connection, so as to ensure, as much as possible, that the terminal device can normally release the RRC connection, and ensure that a communication process is normally performed.

According to a seventh aspect, a terminal device is provided. The terminal device has functions for implementing the terminal device in the foregoing method designs. The functions may be implemented by hardware, or may be implemented by hardware executing corresponding software. The hardware or the software includes one or more units corresponding to the foregoing functions.

In a possible design, a specific structure of the terminal device may include a sending module, a processing module, and a receiving module. The sending module, the processing module, and the receiving module may perform corresponding functions in the method provided in any one of the first aspect or the possible designs of the first aspect.

According to an eighth aspect, a network device is provided. The network device has functions for implementing the network device in the foregoing method designs. The functions may be implemented by hardware, or may be implemented by hardware executing corresponding software. The hardware or the software includes one or more units corresponding to the foregoing functions.

In a possible design, a specific structure of the network device may include a sending module, a processing module, and a receiving module. The sending module, the processing module, and the receiving module may perform corresponding functions in the method provided in any one of the second aspect or the possible designs of the second aspect.

According to a ninth aspect, a network device is provided. The network device has functions for implementing the network device in the foregoing method designs. The functions may be implemented by hardware, or may be implemented by hardware executing corresponding software. The hardware or the software includes one or more units corresponding to the foregoing functions.

In a possible design, a specific structure of the network device may include a sending module and a processing module. The sending module and the processing module may perform corresponding functions in the method provided in any one of the third aspect or the possible designs of the third aspect.

According to a tenth aspect, a terminal device is provided. The terminal device has functions for implementing the terminal device in the foregoing method designs. The functions may be implemented by hardware, or may be implemented by hardware executing corresponding software. The hardware or the software includes one or more units corresponding to the foregoing functions.

In a possible design, a specific structure of the terminal device may include a receiving module. Optionally, the specific structure of the terminal device may further include a sending module. The receiving module and the sending module may perform corresponding functions in the method provided in any one of the fourth aspect or the possible designs of the fourth aspect.

According to an eleventh aspect, a terminal device is provided. The terminal device has functions for implementing the terminal device in the foregoing method designs. The functions may be implemented by hardware, or may be implemented by hardware executing corresponding software. The hardware or the software includes one or more units corresponding to the foregoing functions.

In a possible design, a specific structure of the terminal device may include a receiving module and a processing module. The receiving module and the processing module may perform corresponding functions in the method provided in any one of the fifth aspect or the possible designs of the fifth aspect.

According to a twelfth aspect, a network device is provided. The network device has functions for implementing the network device in the foregoing method designs. The functions may be implemented by hardware, or may be implemented by hardware executing corresponding software. The hardware or the software includes one or more units corresponding to the foregoing functions.

In a possible design, a specific structure of the network device may include a sending module and a receiving module. The sending module and the receiving module may perform corresponding functions in the method provided in any one of the sixth aspect or the possible designs of the sixth aspect.

According to a thirteenth aspect, a communications apparatus is provided. The communications apparatus may be the terminal device in the foregoing method designs, or a chip disposed in the terminal device. The communications apparatus includes: a memory, configured to store computer executable program code; a communications interface; and a processor, where the processor is coupled to the memory and the communications interface. The program code stored in the memory includes an instruction, and when the processor executes the instruction, the communications apparatus is enabled to perform the method performed by the terminal device in any one of the first aspect or the possible designs of the first aspect.

According to a fourteenth aspect, a communications apparatus is provided. The communications apparatus may be the network device in the foregoing method designs, or a chip disposed in the network device. The communications apparatus includes: a memory, configured to store computer executable program code; a communications interface; and a processor, where the processor is coupled to the memory and the communications interface. The program code stored in the memory includes an instruction, and when the processor executes the instruction, the communications apparatus is enabled to perform the method performed by the network device in any one of the second aspect or the possible designs of the second aspect.

According to a fifteenth aspect, a communications apparatus is provided. The communications apparatus may be the network device in the foregoing method designs, or a chip disposed in the network device. The communications apparatus includes: a memory, configured to store computer executable program code; a communications interface; and a processor, where the processor is coupled to the memory and the communications interface. The program code stored in the memory includes an instruction, and when the processor executes the instruction, the communications apparatus is enabled to perform the method performed by the network device in any one of the third aspect or the possible designs of the third aspect.

According to a sixteenth aspect, a communications apparatus is provided. The communications apparatus may be the terminal device in the foregoing method designs, or a chip disposed in the terminal device. The communications apparatus includes: a memory, configured to store computer executable program code; a communications interface; and a processor, where the processor is coupled to the memory and the communications interface. The program code stored in the memory includes an instruction, and when the processor executes the instruction, the communications apparatus is enabled to perform the method performed by the terminal device in any one of the fourth aspect or the possible designs of the fourth aspect.

According to a seventeenth aspect, a communications apparatus is provided. The communications apparatus may be the terminal device in the foregoing method designs, or a chip disposed in the terminal device. The communications apparatus includes: a memory, configured to store computer executable program code; a communications interface; and a processor, where the processor is coupled to the memory and the communications interface. The program code stored in the memory includes an instruction, and when the processor executes the instruction, the communications apparatus is enabled to perform the method performed by the terminal device in any one of the fifth aspect or the possible designs of the fifth aspect.

According to an eighteenth aspect, a communications apparatus is provided. The communications apparatus may be the network device in the foregoing method designs, or a chip disposed in the network device. The communications apparatus includes: a memory, configured to store computer executable program code; a communications interface; and a processor, where the processor is coupled to the memory and the communications interface. The program code stored in the memory includes an instruction, and when the processor executes the instruction, the communications apparatus is enabled to perform the method performed by the network device in any one of the sixth aspect or the possible designs of the sixth aspect.

According to a nineteenth aspect, a computer storage medium is provided. The computer readable storage medium stores an instruction, and when the instruction is run on a computer, the computer is enabled to perform the method in any one of the first aspect or the possible designs of the first aspect.

According to a twentieth aspect, a computer storage medium is provided. The computer readable storage medium stores an instruction, and when the instruction is run on a computer, the computer is enabled to perform the method in any one of the second aspect or the possible designs of the second aspect.

According to a twenty-first aspect, a computer storage medium is provided. The computer readable storage medium stores an instruction, and when the instruction is run on a computer, the computer is enabled to perform the method in any one of the third aspect or the possible designs of the third aspect.

According to a twenty-second aspect, a computer storage medium is provided. The computer readable storage medium stores an instruction, and when the instruction is run on a computer, the computer is enabled to perform the method in any one of the fourth aspect or the possible designs of the fourth aspect.

According to a twenty-third aspect, a computer storage medium is provided. The computer readable storage medium stores an instruction, and when the instruction is run on a computer, the computer is enabled to perform the method in any one of the fifth aspect or the possible designs of the fifth aspect.

According to a twenty-fourth aspect, a computer storage medium is provided. The computer readable storage medium stores an instruction, and when the instruction is run on a computer, the computer is enabled to perform the method in any one of the sixth aspect or the possible designs of the sixth aspect.

According to a twenty-fifth aspect, a computer program product including an instruction is provided. The computer program product stores the instruction, and when the computer program product is run on a computer, the computer is enabled to perform the method in any one of the first aspect or the possible designs of the first aspect.

According to a twenty-sixth aspect, a computer program product including an instruction is provided. The computer program product stores the instruction, and when the computer program product is run on a computer, the computer is enabled to perform the method in any one of the second aspect or the possible designs of the second aspect.

According to a twenty-seventh aspect, a computer program product including an instruction is provided. The computer program product stores the instruction, and when the computer program product is run on a computer, the computer is enabled to perform the method in any one of the third aspect or the possible designs of the third aspect.

According to a twenty-eighth aspect, a computer program product including an instruction is provided. The computer program product stores the instruction, and when the computer program product is run on a computer, the computer is enabled to perform the method in any one of the fourth aspect or the possible designs of the fourth aspect.

According to a twenty-ninth aspect, a computer program product including an instruction is provided. The computer program product stores the instruction, and when the computer program product is run on a computer, the computer is enabled to perform the method in any one of the fifth aspect or the possible designs of the fifth aspect.

According to a thirtieth aspect, a computer program product including an instruction is provided. The computer program product stores the instruction, and when the computer program product is run on a computer, the computer is enabled to perform the method in any one of the sixth aspect or the possible designs of the sixth aspect.

In the embodiments of this application, the terminal device applies to the network device for semi-persistent scheduling, and the network device does not need to determine whether semi-persistent scheduling needs to be configured for the terminal device, so that a configuration result better meets a requirement of the terminal device. This can also reduce a resource waste caused by a dynamic scheduling manner used because the network device cannot determine whether semi-persistent scheduling needs to be configured.

DESCRIPTION OF EMBODIMENTS

Figure 1:
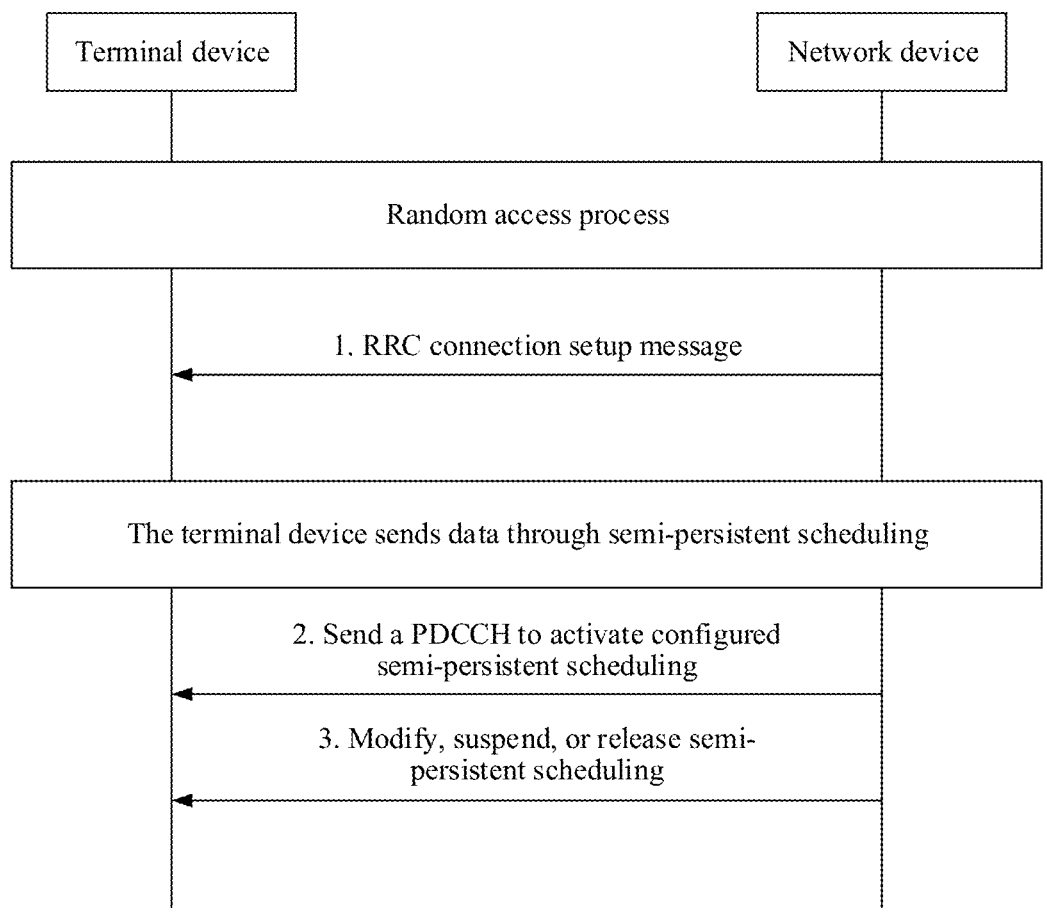
FIG. 1 is a schematic diagram of a working procedure of SPS in an LTE system.

To make the purpose, technical solutions, and advantages of the embodiments of this application clearer, the following clearly and completely describes the technical solutions of the embodiments of this application with reference to the accompanying drawings in the embodiments of this application.

Some terms of the embodiments of this application are described below, to facilitate understanding by a person skilled in the art.

1. Terminal device: The terminal device includes a device that provides a user with voice and/or data connectivity, for example, may include a handheld device with a wireless connection function, or a processing device connected to a wireless modem. The terminal device may communicate with a core network through a radio access network (radio access network, RAN), and exchange voice and/or data with the RAN. The terminal device may include user equipment (user equipment, UE), a wireless terminal device, a mobile terminal device, a subscriber unit (subscriber unit), a subscriber station (subscriber station), a mobile station (mobile station), a mobile (mobile) console, a remote station (remote station), an access point (access point, AP), a remote terminal (remote terminal) device, an access terminal (access terminal) device, a user terminal (user terminal) device, a user agent (user agent), a user device (user device), or the like. For example, the terminal device may include a mobile phone (or referred to as a "cellular" phone), a computer with a mobile terminal device, a portable, pocket-sized, handheld, computer built-in, or in-vehicle mobile apparatus, an intelligent wearable device, or the like. For example, the terminal device includes a device such as a personal communications service (personal communication service, PCS) phone, a cordless telephone set, a session initiation protocol (session initiation protocol, SIP) phone, a wireless local loop (wireless local loop, WLL) station, a personal digital assistant (personal digital assistant, PDA), a smartwatch, a smart helmet, smart glasses, or a smart band. The terminal device further includes a limited device, for example, a device with relatively low power consumption, a device with a limited storage capability, or a device with a limited computing capability. For example, the terminal device includes an information sensing device such as a barcode, radio frequency identification (radio frequency identification, RFID), a sensor, a global positioning system (global positioning system, GPS), or a laser scanner.

2. Network device: The network device includes, for example, a base station (for example, an access point), and may be a device that communicates with a wireless terminal device over an air interface by using one or more cells in an access network. The base station may be configured to mutually convert a received over-the-air frame and an internet protocol (IP) packet, and serve as a router between the terminal device and a rest portion of the access network. The rest portion of the access network may include an IP network. The base station may further coordinate attribute management of the air interface. For example, the base station may include an evolved NodeB (NodeB, eNB, or e-NodeB, evolutional NodeB) in an LTE system or an evolved LTE (LTE-Advanced, LTE-A) system, or may include a next generation NodeB (next generation nodeB, gNB) in a 5th generation (fifth generation, 5G) mobile communications technology new radio (new radio, NR) system. This is not limited in the embodiments of this application.

3. NB-IoT: Currently, the 3rd generation partnership project (3rd generation partnership project, 3GPP) standard focuses on carrying an IoT service based on a cellular network by designing a new air interface and fully using a characteristic of a narrowband technology. This type of IoT is referred to as NB-IoT. Compared with a conventional cellular network, a service and a terminal device in an NB-IoT system are characterized by the following:

(1) Low service rate and long service period: Compared with the conventional cellular network, the NB-IoT service generates smaller data packets, and is usually insensitive to a delay.

(2) Massive-connection requirement: One NB-IoT base station may cover a large quantity of internet of things terminal devices such as smart water/electricity meters, smart households, vehicles, and wearable devices that are massively deployed. For example, a quantity of terminal devices may exceed tens of thousands.

(3) Low-cost requirement: Compared with an existing cellular network terminal device, the NB-IoT system requires a lower-cost terminal device, to implement massive deployment of terminal devices. The low-cost requirement requires that implementation complexity of the terminal device is also very low.

(4) Low power consumption requirement: The NB-IoT system requires lower power consumption of the terminal device, to save battery power of the terminal device, and ensure that the terminal device has an extra-long standby time, so as to reduce labor costs of battery replacement.

To meet the foregoing requirements such as low costs and deep coverage, the NB-IoT system has many special designs. For example, the NB-IoT system has no PUCCH, to simplify the terminal device and reduce costs. In addition, to implement deep coverage, a control channel (for example, a narrowband physical downlink control channel (narrow physical downlink control channel, NPDCCH)), a data channel (for example, a narrowband physical downlink shared channel (narrow physical downlink shared channel, NPDSCH), and a narrowband physical uplink shared channel (narrow physical uplink shared channel, NPUSCH)) that are in the NB-IoT system are repeatedly sent, so that a probability that a terminal device with relatively poor coverage successfully receives same content is increased through hundreds or thousands of times of repeated sending.

4. SPS: Semi-persistent scheduling is also referred to as semi-persistent scheduling. An LTE system supports an SPS scheduling manner. For some relatively regular services (for example, a voice over internet protocol (voice over internet protocol, VoIP)) with a small service volume, SPS may be used to allocate resources in a relatively long time at a time, and dynamic allocation does not need to be performed at each time of transmission. In such a mechanism, overheads of PDCCH control signaling are reduced.

5. Downlink control information (downlink control information, DCI): is carried on a PDCCH. The downlink control information sent by a base station to a terminal device may include uplink-downlink resource allocation, hybrid automatic repeat request (hybrid automatic repeat request, HARQ) information, power control, and the like.

For current DCI, one piece of DCI is usually used to schedule one TB. A new DCI format is further provided in the embodiments of this application. For DCI in the new DCI format, one piece of DCI may be used to schedule at least two TBs. In this case, there may also be a plurality of new DCI formats, and DCI used to schedule different quantities of TBs may be considered as DCI in different formats.

6. The terms "system" and "network" may be used interchangeably in the embodiments of this application. "A plurality of" means two or more than two. In view of this, "a plurality of" may also be understood as "at least two" in the embodiments of this application. The term "and/or" describes an association relationship for describing associated objects and represents that three relationships may exist. For example, A and/or B may represent the following three cases: Only A exists, both A and B exist, and only B exists. In addition, the character "/" usually indicates an "or" relationship between the associated objects unless specified otherwise.

In addition, unless otherwise stated, ordinal numbers such as "first" and "second" in the embodiments of this application are used to distinguish between a plurality of objects, but are not intended to limit a sequence, a time sequence, priorities, or importance of the plurality of objects.

The foregoing describes some concepts in the embodiments of this application, and the following describes a working procedure of SPS in an LTE system.

FIG. 1 is a schematic diagram of a working procedure of SPS in an LTE system. In the LTE system, SPS is applied only to a terminal device in a connected mode. Therefore, the terminal device needs to first set up a radio resource control (radio resource control, RRC) connection to a network device in a random access process. In the following descriptions, for example, the network device is a base station.

1. The base station sends a radio resource control connection setup (RRC connection setup) message to the terminal device. In this case, the terminal device receives the RRC connection setup message sent by the base station.

In the LTE system, SPS is mainly designed for a voice service. The voice service is characterized by a fixed period and a fixed data rate, and therefore is relatively suitable for being scheduled in a semi-persistent scheduling manner. The base station may determine, based on QoS information of a service, whether the service is the voice service, to determine whether to configure SPS.

If the base station determines to configure SPS for a service, in the LTE system, SPS is configured by using RRC signaling, and earliest RRC signaling that can be used to configure SPS is RRC connection setup and is used as an example in FIG. 1. Alternatively, after an RRC connection is set up, SPS may be configured by using an RRC connection reconfiguration (RRC connection reconfiguration) message.

An RRC configuration mainly includes an SPS-radio network temporary identifier (radio network temporary identity, RNTI), an SPS scheduling period, and the like that are of the terminal device.

2. The base station sends a PDCCH to the terminal device to activate configured SPS. In this case, the terminal device receives the PDCCH sent by the base station.

After SPS is configured by using the RRC signaling, SPS further needs to be activated by using a PDCCH scrambled by using the SPS-RNTI. The PDCCH further carries DCI. Only after receiving the PDCCH scrambled by using the SPS-RNTI, the terminal device determines that SPS is activated, and further performs data receiving and sending by using an SPS resource. The DCI carried on the PDCCH includes resource scheduling information, for example, includes a modulation and coding scheme (modulation and coding scheme, MCS) used on the SPS resource and a transport block size (transport block size, TBS) used on the SPS resource.

The terminal device performs data receiving or sending on a corresponding periodic SPS resource based on configured SPS by using the scheduling information in the received DCI. The base station no longer needs to send the PDCCH for each SPS resource.

3. The base station modifies an SPS configuration, suspends SPS, or releases SPS.

In consideration of a network resource status and a possible change of a wireless environment of the terminal device, scheduling information used by the base station to schedule the terminal device also needs to change in a timely manner. The base station may use, at any time, the PDCCH scrambled by using the SPS-RNTI to change scheduling information used for SPS, that is, reactivate SPS. Alternatively, the base station may use, at any time, the PDCCH scrambled by using the SPS-RNTI to stop an SPS scheduling manner.

In addition, the base station may further use, at any time, the RRC connection reconfiguration (RRC connection reconfiguration) message to release an SPS resource configured by using the RRC signaling.

SPS in a conventional LTE system is for a voice service. The conventional LTE system has a different SPS requirement from an NB-IoT system. In addition, an air interface design and the like that are in the conventional LTE system are also different from those in the NB-IoT system. Therefore, SPS in the conventional LTE system cannot adapt to an NB-IoT scenario well. Details are as follows:

a. In the LTE system, the base station may determine, based on QoS of a service, whether the service is a voice service, and therefore the base station may determine whether to configure SPS for the service. However, an SPS application scenario in the NB-IoT system is not for the voice service. Therefore, in some cases, the base station may not determine whether SPS needs to be configured for a service.

b. After SPS in the LTE system is activated, the base station does not need to send a PDCCH for each time of periodic data transmission to perform scheduling, so that the PDCCH is saved from a perspective of a network. However, from a perspective of the terminal device, because the base station may further use the PDCCH to reactivate or suspend scheduling SPS, the terminal device still needs to continuously listen on the PDCCH. Therefore, power consumption of the terminal device is not reduced.

c. During use of SPS, coverage enhancement is not considered in the LTE system. Therefore, a coverage level problem is not considered in an SPS configuration or the like.

d. SPS in the LTE system is mainly used for a voice service, and therefore is used when the terminal device is in a connected mode. However, in the NB-IoT system, the connected mode is mainly applied to a small data packet transmission scenario, and transmission of a large data amount is mainly performed in an idle mode SC-PTM (for example, a software upgrade). However, SPS in the LTE system does not support use in an idle mode.

In view of this, the technical solutions in the embodiments of this application are provided, so that the foregoing problems can be resolved. The embodiments of this application may be applied to the NB-IoT system, or may be applied to another similar communications system.

Figure 2:
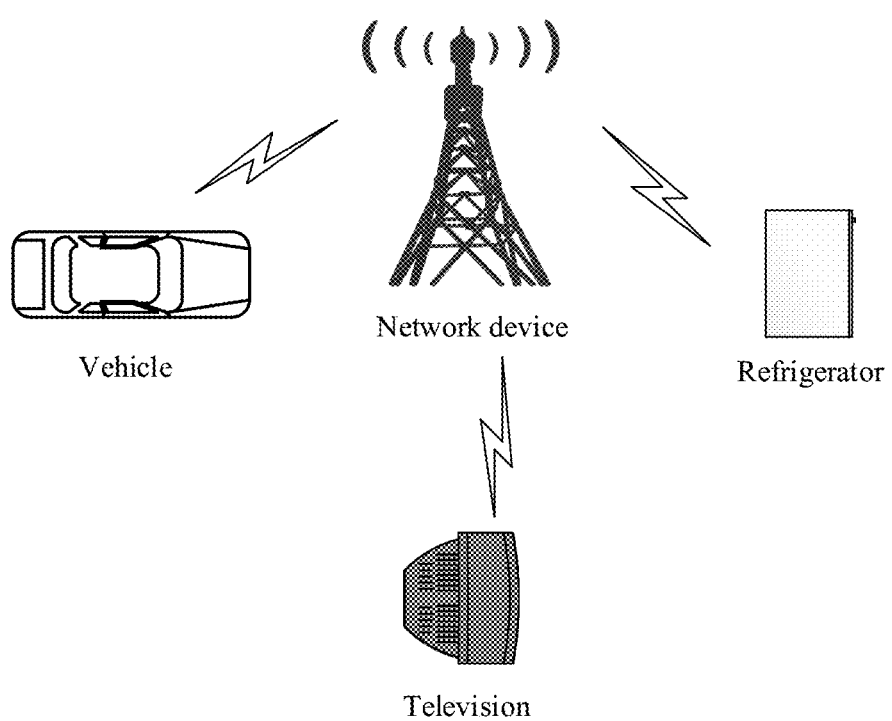
FIG. 2 is a schematic diagram of an application scenario according to an embodiment of this application.

The technical background of the embodiments of this application is described above. For the following descriptions, refer to FIG. 2. FIG. 2 is a schematic diagram of an application scenario according to an embodiment of this application.

FIG. 2 includes a network device and a plurality of terminal devices. These terminal devices are terminal devices in an NB-IoT system, for example, include a refrigerator, a vehicle, and a television. For example, the network device is a base station. The base station may schedule these terminal devices in an SPS scheduling manner.

With reference to the accompanying drawings, the following describes the technical solutions provided in the embodiments of this application. An example in which the technical solutions provided in the embodiments of this application are applied to the application scenario shown in FIG. 2 is used in the following description process. In actual application, this is certainly not limited thereto.

Figure 3:
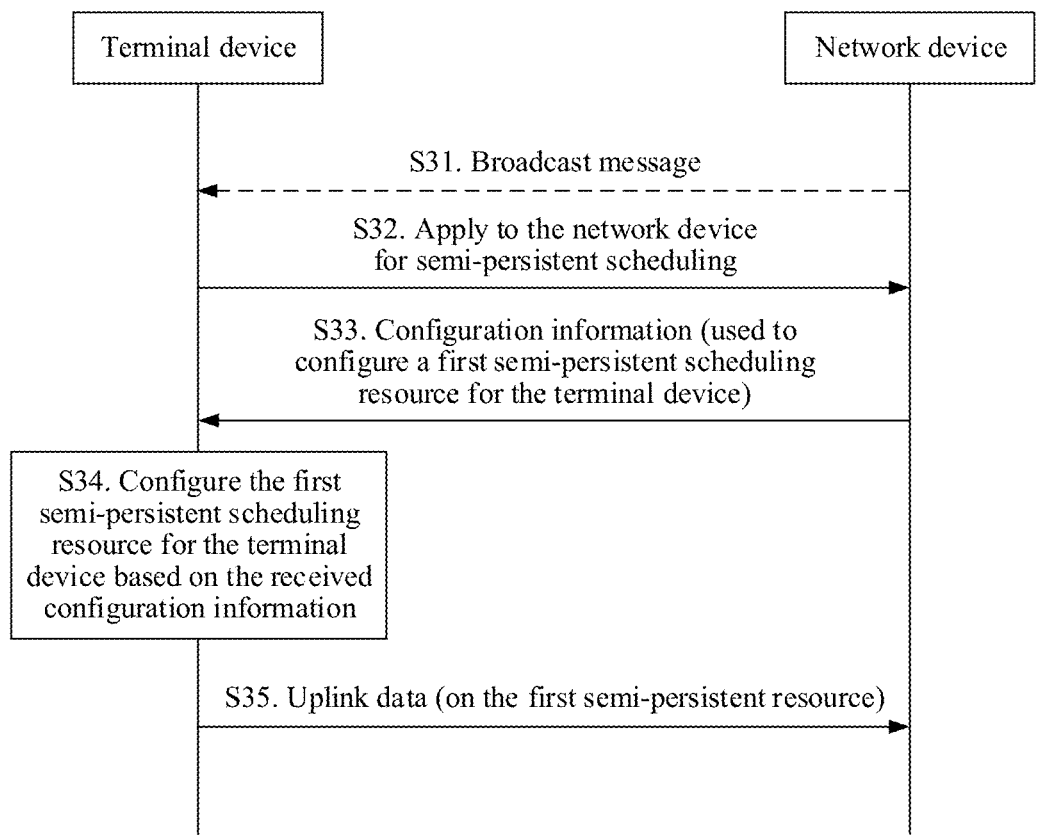
FIG. 3 is a flowchart of a resource configuration method according to an embodiment of this application.

Referring to FIG. 3, an embodiment of this application provides a resource configuration method. A procedure of the method is described below.

S31. A network device sends a broadcast message. The broadcast message is used to indicate that the network device supports semi-persistent scheduling; or the broadcast message is used to indicate a random access resource reserved by the network device for a terminal device to apply for semi-persistent scheduling.

For example, the broadcast message is a system message, or may be another message. If the network device supports semi-persistent scheduling, the broadcast message may be used to notify the terminal device in any one of the following manners:

Manner 1: Explicit indication manner.

In this manner, the broadcast message may directly indicate that the network device supports semi-persistent scheduling. For example, the broadcast message may carry semi-persistent scheduling indication information, and the semi-persistent scheduling indication information occupies, for example, 1 bit (bit) or a plurality of bits. For example, the semi-persistent scheduling indication information occupies 1 bit. If a value of the bit is "0", it indicates that the network device does not support semi-persistent scheduling; or if a value of the bit is "1", it indicates that the network device supports semi-persistent scheduling. Alternatively, if the network device supports semi-persistent scheduling, the semi-persistent scheduling indication information is carried in the broadcast message; or if the network device does not support semi-persistent scheduling, the semi-persistent scheduling indication information is not carried in the broadcast message. Alternatively, the broadcast message is a dedicated message used to indicate whether the network device supports semi-persistent scheduling. In this case, if the network device sends the broadcast message, it indicates that the network device supports semi-persistent scheduling. If the network device does not send the broadcast message, it indicates that the network device does not support semi-persistent scheduling.

In addition, in this manner, the broadcast message may further indicate a coverage level that is of semi-persistent scheduling and that is supported by the network device, so that the terminal device can determine, based on the coverage level that is of semi-persistent scheduling and that is supported by the network device and a coverage level of the terminal device, whether to apply for semi-persistent scheduling. If the coverage level of the terminal device is included in the coverage level that is of semi-persistent scheduling and that is supported by the network device, in other words, the coverage level that is of semi-persistent scheduling and that is supported by the network device includes the coverage level of the terminal device, the terminal device determines that semi-persistent scheduling can be applied for. If the coverage level that is of semi-persistent scheduling and that is supported by the network device does not include the coverage level of the terminal device, the terminal device cannot apply for semi-persistent scheduling. For example, the coverage levels of semi-persistent scheduling that are supported by the network device are a coverage level 1 and a coverage level 2. If the coverage level of the terminal device is the coverage level 1 or the coverage level 2, the terminal device can apply for semi-persistent scheduling. If the coverage level of the terminal device is a coverage level 3, the terminal device cannot apply for semi-persistent scheduling because the network device cannot support to use the coverage level 3 for semi-persistent scheduling.

The network device may support one or more coverage levels. For example, different coverage levels may be represented by using different identifiers. In this case, a coverage level corresponding to an identifier included in the broadcast message is a coverage level supported by the network device.

Manner 2: Implicit indication manner.

In this manner, the broadcast message may indicate the random access resource reserved for the terminal device to apply for semi-persistent scheduling. To be specific, if the network device indicates the random access resource reserved for the terminal device to apply for semi-persistent scheduling, it certainly indicates that the network device supports semi-persistent scheduling. In this case, if the terminal device performs random access by using the random access resource indicated by the network device, it indicates that the terminal device applies for semi-persistent scheduling. The reserved random access resource may include at least one of a reserved time domain resource, a reserved frequency domain resource, and a reserved code domain resource. The reserved frequency domain resource may include at least one of a reserved subcarrier and a reserved carrier, and the reserved code domain resource includes a reserved preamble.

In this manner, the broadcast message may also indicate a coverage level that is of semi-persistent scheduling and that corresponds to the reserved random access resource, so that the terminal device can determine, based on the coverage level that is of semi-persistent scheduling and that corresponds to the reserved random access resource and a coverage level of the terminal device, whether to apply for semi-persistent scheduling. The reserved random access resource may correspond to one or more coverage levels, to be specific, in the reserved random access resources, different random access resources may correspond to a same coverage level, or different random access resources may correspond to different coverage levels. In this case, the terminal device selects a corresponding random access resource from the reserved random access resources based on the coverage level of the terminal device. For example, the reserved random access resources include a random access resource 1 and a random access resource 2, a coverage level corresponding to the random access resource 1 is a coverage level 1, a coverage level corresponding to the random access resource 2 is a coverage level 2, and the coverage level of the terminal device is the coverage level 2. In this case, the terminal device may select the random access resource 2 from the reserved random access resources to apply for semi-persistent scheduling Step S31 is not mandatory. To distinguish between step S31 and a mandatory step, an arrow representing step S31 is drawn in a dashed line in FIG. 3.

S32. If the terminal device applies to the network device for semi-persistent scheduling, the network device determines that the terminal device applies for semi-persistent scheduling.

The terminal device may apply to the network device for semi-persistent scheduling in a scenario in which the terminal device needs to transmit a large amount of data, a scenario in which the terminal device needs to periodically transmit data, a scenario in which the terminal device needs to deal with some burst uplink data, or the like.

In this embodiment of this application, the terminal device may apply to the network device for semi-persistent scheduling in different manners. An application manner of the terminal device is related to a manner in which the network device sends the broadcast message in step S31.

Application Manner a: Explicit Application Manner.

When the broadcast message is used to indicate that the network device supports semi-persistent scheduling, to be specific, when the network device performs indication in step S31 in the manner 1, the terminal device may send semi-persistent scheduling request information to the network device by using first RRC signaling. The semi-persistent scheduling request information is used to apply for semi-persistent scheduling.

For example, the first RRC signaling is an RRC connection setup request message (for example, an Msg3 in a random access process). Certainly, an implementation of the first RRC signaling is not limited in this embodiment of this application.

In this manner, the broadcast message further supports a coverage level that is of semi-persistent scheduling and that is supported by the network device. In this case, if the network device supports only one coverage level, semi-persistent scheduling only needs to be directly applied for by using the first RRC signaling. However, if the network device supports a plurality of coverage levels, the terminal device may add a coverage level of the terminal device to the first RRC signaling, or add, to the first RRC signaling, a coverage level of semi-persistent scheduling for which the terminal device applies. Therefore, the network device can determine a coverage level for which the terminal device applies. Alternatively, the network device may obtain a coverage level of the terminal device in advance. For example, the network device may determine the coverage level of the terminal device by using a random access resource used by the terminal device to initiate random access. To be specific, different random access resources may correspond to different coverage levels. If the terminal device initiates random access to the network device by using a corresponding random access resource, it indicates that the coverage level of the terminal device is a coverage level corresponding to the random access resource. In this case, even if the network device supports the plurality of coverage levels, semi-persistent scheduling also only needs to be directly applied for by using the first RRC signaling.

After receiving the first RRC signaling, the network device may determine, based on the coverage level of the terminal device, the coverage level for which the terminal device applies.

Application Manner b: Implicit Application Manner.

When the broadcast message is used to indicate the random access resource reserved by the network device for the terminal device to apply for semi-persistent scheduling, to be specific, when the network device performs indication in step S31 in the manner 2, the terminal device directly sends a random access preamble (preamble) to the network device by using a first random access resource in the reserved random access resource. In this manner, the first random access resource in the reserved random access resource is actually used to apply for semi-persistent scheduling. The network device can determine that the terminal device applies for semi-persistent scheduling, provided that the network device receives, by using the reserved random access resource, the random access preamble sent by the terminal device.

If the broadcast message further indicates a coverage level corresponding to the reserved random access resource, for example, the reserved random access resources include a random access resource 1 and a random access resource 2, a coverage level corresponding to the random access resource 1 is a coverage level 1, a coverage level corresponding to the random access resource 2 is a coverage level 2, and a coverage level of the terminal device is the coverage level 2, the terminal device may choose to send the random access preamble to the network device by using the random access resource 2. After receiving the random access preamble by using the random access resource 2, the network device may determine that the terminal device applies for semi-persistent scheduling, and a coverage level of semi-persistent scheduling for which the terminal device applies is the coverage level 2.

S33. If the network device sends configuration information to the terminal device, the terminal device receives the configuration information sent by the network device. The configuration information is used to configure a semi-persistent scheduling resource for the terminal device. The semi-persistent scheduling resource is referred to as a first semi-persistent scheduling resource below.

After the network device receives the first information sent by the terminal device, if the network device determines that the terminal device applies for semi-persistent scheduling, the network device configures the first semi-persistent scheduling resource for the terminal device. In other words, the network device generates the configuration information used to configure the first semi-persistent scheduling resource for the terminal device. For example, the network device may send the configuration information to the terminal device by using second RRC signaling. In other words, the second RRC signaling carries the configuration information.

In this embodiment of this application, the configuration information is used to indicate at least one of a scheduling period of the first semi-persistent scheduling resource, a quantity of repeated transmission times, an MCS used on the first semi-persistent scheduling resource, and a TBS used on the first semi-persistent scheduling resource. Certainly, the configuration information may further indicate other information used to configure the first semi-persistent scheduling resource. That the configuration information is used to indicate one piece of information may be understood as follows: The configuration information includes the information, or the configuration information includes information used to indicate the information. For example, that the configuration information is used to indicate the quantity of repeated transmission times may be understood as follows: The configuration information includes the quantity of repeated transmission times, or the configuration information includes information used to indicate the quantity of repeated transmission times. The quantity of repeated transmission times can be determined by using the information used to indicate the quantity of repeated transmission times.

The quantity of repeated transmission times is used to indicate a quantity of times of repeated transmission on the first semi-persistent scheduling resource. After a coverage level is determined, the network device may configure, based on a case, a quantity of repeated transmission times that corresponds to the coverage level. When a same coverage level is applied to different terminal devices, the network device probably configures different quantities of repeated transmission times. For example, if both a terminal device 1 and a terminal device 2 apply for semi-persistent scheduling, and both coverage levels of semi-persistent scheduling that is applied for are a coverage level 1, based on a factor such as coverage statuses or application scenarios of different terminal devices, the network device may configure one repeated transmission time for the coverage level 1 of the terminal device 1, and configure two repeated transmission times for the coverage level 1 of the terminal device 2.

If the terminal device needs to use the first semi-persistent scheduling resource, in addition to configuring the first semi-persistent scheduling resource for the terminal device, the network device needs to activate the first semi-persistent scheduling resource. In this embodiment of this application, the configuration information may be used to configure the first semi-persistent scheduling resource. In this case, after the first semi-persistent scheduling resource is configured, the first semi-persistent scheduling resource may be further activated. For example, the network device further activates the first semi-persistent scheduling resource by using a PDCCH scrambled by using an SPS-RNTI. The PDCCH further carries DCI. Only after the terminal device receives the PDCCH scrambled by using the SPS-RNTI, or it is understood that the terminal device receives the DCI carried on the PDCCH scrambled by using the SPS-RNTI, the terminal device determines that the first semi-persistent scheduling resource is activated, and further performs data receiving and sending by using the first semi-persistent scheduling resource.

Alternatively, this embodiment of this application provides a simpler activation manner. To be specific, in addition to being used to configure the first semi-persistent scheduling resource, the configuration information may be used to activate the first semi-persistent scheduling resource. In this case, after receiving the configuration information, the terminal device may consider that the first semi-persistent scheduling resource is activated, and can be directly used. A start location of a $1^{st}$ available first semi-persistent scheduling resource may be a start location that is of a $1^{st}$ first semi-persistent scheduling resource and that is obtained after the terminal device feeds back an acknowledgment (ACK)/a negative acknowledgment (NACK) for RRC connection setup scheduled by the network device. To be specific, if the network device schedules the RRC connection setup, the terminal device feeds back the ACK/NACK to the network device. If the first semi-persistent scheduling resource is a periodic resource, the start location that is the $1^{st}$ first semi-persistent scheduling resource and that is obtained after the terminal device feeds back the ACK/NACK is the start location of the $1^{st}$ available first available semi-persistent scheduling resource. After the location of the $1^{st}$ first available semi-persistent scheduling resource is determined, a subsequent location of the first semi-persistent scheduling resource can be determined based on a period of the first semi-persistent scheduling resource. In this manner, a step required for activating the semi-persistent scheduling resource is reduced, and an activation process is accelerated. In addition, because the PDCCH does not need to be used for activation, transmission resources can also be saved and power consumption of listening, by the terminal device, on the PDCCH used for activation can also be reduced.

S34. The terminal device configures the first semi-persistent scheduling resource for the terminal device based on the configuration information.

After receiving the configuration information, the terminal device configures the first semi-persistent resource for the terminal device based on the configuration information, so that the terminal device can subsequently use the first semi-persistent resource.

S35. If the terminal device sends uplink data to the network device on the first semi-persistent scheduling resource, the network device receives, on the first semi-persistent scheduling resource, the uplink data sent by the terminal device.

After the first semi-persistent scheduling resource is activated, the terminal device can use the first semi-persistent scheduling resource. In this case, the terminal device sends the uplink data to the network device by using the first semi-persistent scheduling resource, and the network device does not need to perform resource scheduling for each piece of uplink data, so that network resources are saved.

In this embodiment of this application, in addition to configuring and activating the first semi-persistent scheduling resource for the terminal device, the network device may stop scheduling the first semi-persistent scheduling resource. For example, after step S33, or if the configuration information is not used to activate the first semi-persistent scheduling resource, but another step further needs to be performed to activate the first semi-persistent scheduling resource, after the first semi-persistent scheduling resource is activated or after step S34, the network device may determine to stop scheduling the first semi-persistent scheduling resource, and the terminal device cannot use the first semi-persistent scheduling resource any more. In this case, the network device needs to notify the terminal device. For example, the network device sends first indication information to the terminal device by using media access control (media access control, MAC) signaling, and the first indication information is used to indicate that scheduling of the first semi-persistent scheduling resource is stopped. In this case, after receiving the MAC signaling and obtaining the first indication information from the MAC signaling, the terminal device may determine that the network device has stopped scheduling the first semi-persistent scheduling resource, and the terminal device stops using the first semi-persistent scheduling resource. For example, the MAC signaling is a MAC control element (control element, CE). Stopping scheduling the first semi-persistent scheduling resource may be considered as follows: Configuration information of the first semi-persistent scheduling resource still exists, in other words, the first semi-persistent scheduling resource is not released. The network device may further re-enable the first semi-persistent scheduling resource subsequently.

As described above, in the LTE system, the base station may use, at any time, the PDCCH scrambled by using the SPS-RNTI to stop the SPS scheduling manner. In this case, to monitor whether the base station sends the PDCCH scrambled by using the SPS-RNTI to stop the SPS scheduling manner, the terminal device needs to always listen on the PDCCH, and therefore power consumption of the terminal device is relatively high. However, in this embodiment of this application, the network device may use the MAC signaling to indicate that scheduling of the first semi-persistent scheduling resource is stopped, and the terminal device does not need to always listen on the PDCCH. This helps reduce power consumption of the terminal device.

In this embodiment of this application, the network device may alternatively reconfigure a new semi-persistent scheduling resource for the terminal device, or may release the first semi-persistent scheduling resource. For example, after step S33, or if the configuration information is not used to activate the first semi-persistent scheduling resource, but another step further needs to be performed to activate the first semi-persistent scheduling resource, after the first semi-persistent scheduling resource is activated or after step S34, the network device sends second indication information to the terminal device by using second RRC signaling. The second indication information is used to configure a second semi-persistent scheduling resource for the terminal device or is used to release the first semi-persistent scheduling resource. In this case, after receiving the second indication information, the terminal device may determine that the network device reconfigures the second semi-persistent scheduling resource for the terminal device, and the terminal device may stop using the first semi-persistent scheduling resource, and start to use the second semi-persistent scheduling resource. Alternatively, after receiving the second indication information, the terminal device may determine that the network device has released the first semi-persistent scheduling resource, and the terminal device no longer uses the first semi-persistent scheduling resource. Releasing the first semi-persistent scheduling resource means that the first semi-persistent scheduling resource is released. The network device cannot subsequently re-enable the first semi-persistent scheduling resource. The second semi-persistent scheduling resource may be a semi-persistent scheduling resource newly configured by the network device, or may be a semi-persistent scheduling resource whose scheduling is previously stopped.

As described above, in the LTE system, the base station may use, at any time, the PDCCH scrambled by using the SPS-RNTI to change the scheduling information used for SPS, that is, reactivate SPS. In this case, to monitor whether the base station sends the PDCCH scrambled by using the SPS-RNTI to reactivate SPS, the terminal device needs to always listen on the PDCCH, and therefore power consumption of the terminal device is relatively high. However, in this embodiment of this application, the network device may use the second RRC signaling to indicate the second semi-persistent scheduling resource, and the terminal device does not need to always listen on the PDCCH. This helps reduce power consumption of the terminal device.

In conclusion, in this embodiment of this application, the terminal device applies to the network device for semi-persistent scheduling. Therefore, after receiving the application from the terminal device, the network device may configure semi-persistent scheduling for the terminal device, and the network device does not need to determine whether semi-persistent scheduling needs to be configured for the terminal device, so that a configuration result better meets a requirement of the terminal device. This can also reduce a resource waste caused by a dynamic scheduling manner used because the network device cannot determine whether semi-persistent scheduling needs to be configured.

The foregoing describes a manner of implementing semi-persistent scheduling in the NB-IoT system. The following further describes, in another embodiment, another manner of implementing semi-persistent scheduling in the NB-IoT system. In both manners, semi-persistent scheduling can be implemented in the NB-IoT system.

An embodiment of this application provides a method for configuring DCI. An example in which the method is applied to the application scenario shown in FIG. 2 is used in the following description process.

In the method, a network device sends DCI format information. The DCI format information is used to indicate a DCI format used by the network device, and the DCI is used to schedule at least two transport blocks. In this case, a terminal device may receive the DCI format information sent by the network device. Then, if the network device sends the DCI, the terminal device receives the DCI sent by the network device.

The DCI indicated by the DCI format information can be used to schedule the at least two transport blocks, so that semi-persistent scheduling is implemented after the DCI is used. System overheads for sending DCI to each transport block in a network are reduced, and power consumption of listening to a plurality of pieces of DCI by the terminal device is also reduced.

The following describes this embodiment by using two scenarios: a scenario in which the terminal device is in an idle mode and a scenario in which the terminal device is in a connected mode.

1. The scenario in which the terminal device is in the idle mode.

Figure 4:
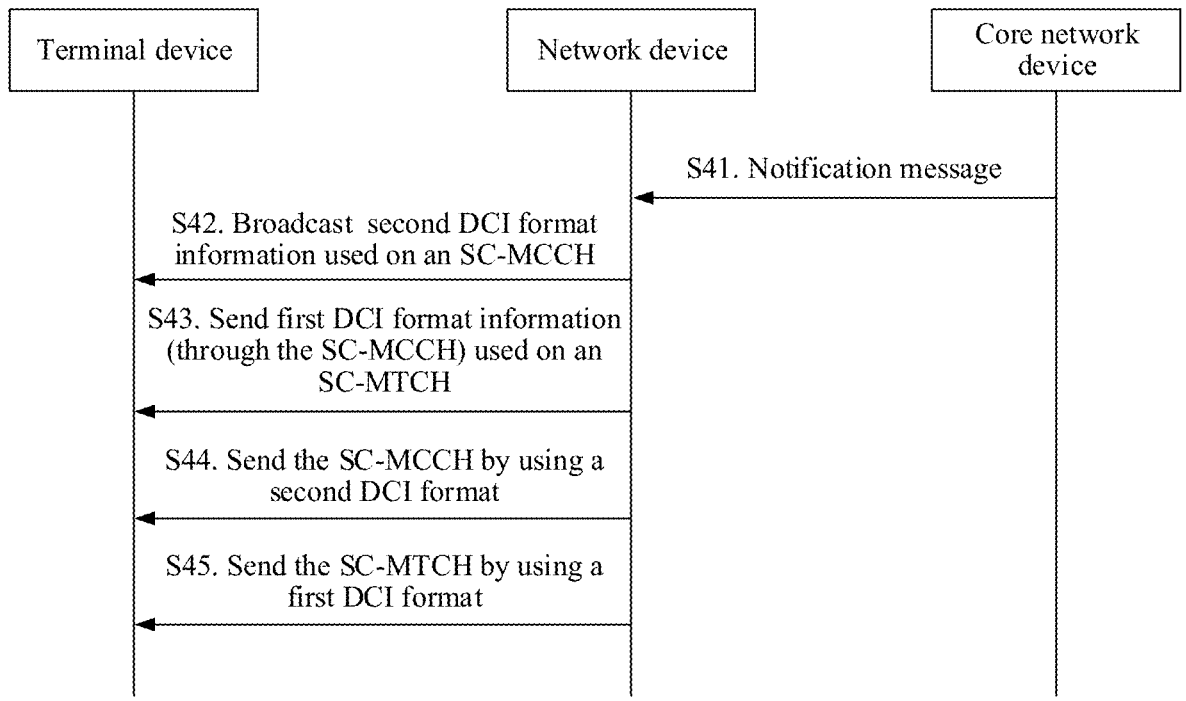
FIG. 4 is a flowchart of a method for configuring DCI when the terminal device is in an idle mode according to an embodiment of this application.

FIG. 4 shows an implementation procedure of a method for configuring DCI in the scenario in which the terminal device is in the idle mode.

S41. A core network device sends a notification message to a network device. The notification message is used to indicate DCI format information supported by a service performed by the network device, and/or the notification message is used to indicate capability information of the terminal device.

For example, the capability information of the terminal device may be used to determine whether the terminal device supports the DCI format.

Because in the idle mode, the network device usually performs a multicast service, the capability information that is of the terminal device and that is indicated by the notification message herein is capability information of all or some terminal devices that can participate in the multicast service.

In this scenario, the step in which the network device sends the DCI format information may include two substeps: the following steps S42 and S43.

S42. If the network device broadcasts second DCI format information used on a single cell multimedia broadcast multicast service control channel (single cell-multimedia broadcast multicast service control channel, SC-MCCH), the terminal device may receive the second DCI format information broadcast by the network device.

When the capability information of the terminal device indicates that the terminal device supports the DCI format, or when the service performed by the network device supports the DCI format, the network device broadcasts the second DCI format information. The second DCI format information may be generated by the network device.

In an example, the network device may use a system broadcast to indicate that a DCI format used on the SC-MCCH is the second DCI format. For example, the system broadcast is a system information block (system information block, SIB) 20. Certainly, a manner in which the network device broadcasts the second DCI format information is not limited in this embodiment of this application.

Step S42 is optional. To be specific, because the SC-MCCH needs to support all terminal devices in a cell, and some of the terminal devices may not support a new DCI format, or services performed by some terminal devices may not need to use a new DCI format, new DCI format information may not need to be configured for the SC-MCCH.

S43. If the network device sends, through the SC-MCCH, first DCI format information used on a single cell multimedia broadcast multicast service traffic channel (single cell-multimedia broadcast multicast service Traffic Channel, SC-MTCH), the terminal device may receive the first DCI format information sent by the network device through the SC-MCCH.

When the capability information of the terminal device indicates that the terminal device supports the DCI format, or when the service performed by the network device supports the DCI format, the network device sends the first DCI format information through the SC-MCCH. The first DCI format information may be generated by the network device.

To be specific, the network device uses the SC-MCCH to indicate the first DCI format information used on each SC-MTCH that needs to use a new DCI format. One service corresponds to one SC-MTCH, and therefore there may be a plurality of SC-MTCHs. The first DCI format information used by the plurality of SC-MTCHs may be different or may be the same. In addition, the first DCI format information may be the same as or different from the second DCI format information, first DCI indicated by the first DCI format information can be used to schedule at least two transport blocks, and second DCI indicated by the second DCI format information can also be used to schedule at least two transport blocks. That the first DCI format information is different from the second DCI format information may mean that the first DCI and the second DCI can be used to schedule different quantities of transport blocks.

Both the SC-MCCH and the SC-MTCH are logical channels. In the scenario in which the terminal device is in the idle mode, data is transmitted between the network device and the terminal device through the SC-MCCH and the SC-MTCH. Therefore, if step S42 is performed, the DCI format includes the first DCI format and the second DCI format in this case. If step S42 is not performed, the DCI format includes the first DCI format in this case.

S44. If the network device sends the SC-MCCH by using the second DCI format, the terminal device receives the SC-MCCH using the second DCI format.

If step S42 is performed, the network device sends the SC-MCCH by using the second DCI format. In other words, step S44 is also optional, and step S44 is performed while ensuring that step S42 is performed.

S45. If the network device sends the SC-MTCH by using the first DCI format according to an indication of the SC-MCCH, the terminal device receives the SC-MTCH using the first DCI format, to be specific, the terminal device receives, based on the first DCI, downlink data sent by the network device.

Step S44 may be performed before or after step S45, or steps S44 and S45 may be simultaneously performed. This is not limited in this embodiment of this application.

According to the method provided in this embodiment of this application, even if the terminal device is in the idle mode, semi-persistent scheduling can also be implemented to save transmission resources.

The foregoing describes the method for configuring DCI when the terminal device is in the idle mode. The following further describes a method for configuring DCI when the terminal device is in the connected mode.

2. The scenario in which the terminal device is in the connected mode.

Figure 5:
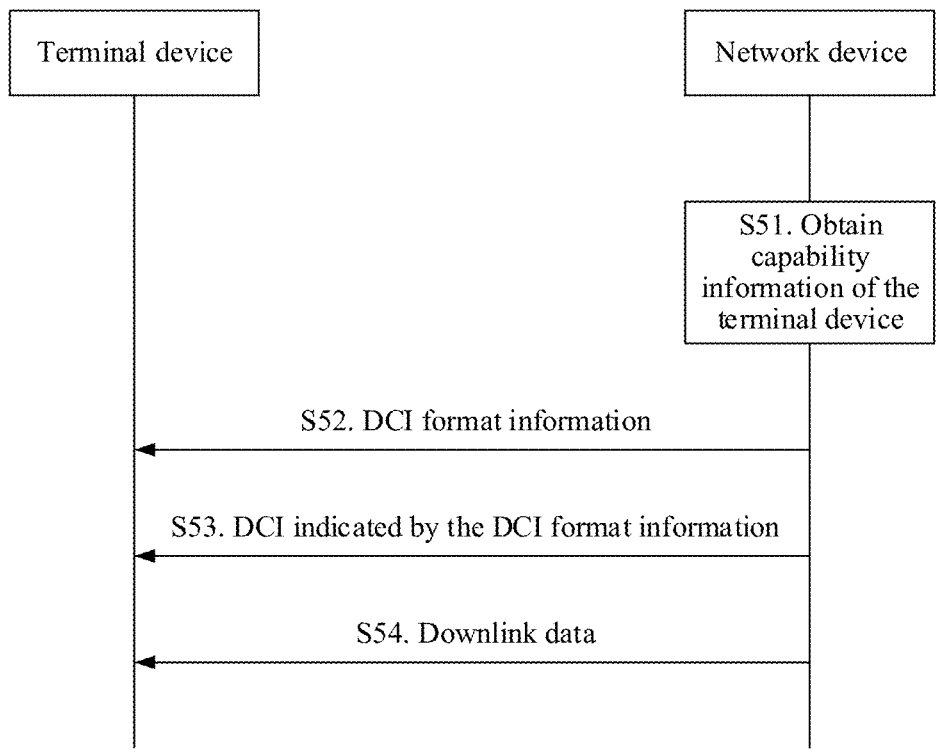
FIG. 5 is a flowchart of a method for configuring DCI when the terminal device is in a connected mode according to an embodiment of this application.

FIG. 5 shows an implementation procedure of a method for configuring DCI in the scenario in which the terminal device is in the connected mode.

S51. A network device obtains capability information of the terminal device.

For example, the network device needs to obtain a capability of supporting the DCI format information by the terminal device.

In the connected mode, the terminal device usually performs a unicast service. Therefore, a unicast scenario is described in this embodiment. In this case, the network device may obtain the capability information of the terminal device in a plurality of different manners. The several manners are described as follows:

a. The terminal device sends the capability information of the terminal device to the network device.

b. The network device obtains the capability information of the terminal device in a random access process of the terminal device.

For example, in the random access process performed by the terminal device, the terminal device adds the capability information of the terminal device to an Msg3 message.

c. The network device receives the capability information of the terminal device that is sent by a core network device.

For example, when releasing a connection to the terminal device last time, the network device may forward the capability information of the terminal device to the core network device for storage. In this case, the network device may subsequently obtain the capability information of the terminal device from the core network device.

The foregoing several manners in which the network device obtains the capability information of the terminal device are merely examples. The capability information of the terminal device is not limited to being obtained in the foregoing several manners in this embodiment of this application.

S52. If the network device sends the DCI format information to the terminal device, the terminal device receives the DCI format information sent by the network device.

If the network device determines, by using the capability information of the terminal device, that the terminal device can support the DCI format information, in other words, the terminal device can support DCI indicated by the DCI format information, the network device may send the DCI format information to the terminal device. For example, the network device may send the DCI format information to the terminal device by using RRC signaling. The DCI format information may be generated by the network device.

S53. If the network device sends the DCI to the terminal device, the terminal device receives the DCI. The DCI is the DCI indicated by the DCI format.

S54. If the network device sends downlink data to the terminal device based on scheduling of the DCI, the terminal device receives, based on scheduling of the DCI, the downlink data sent by the network device.

For example, the network device may perform downlink scheduling by using the DCI, and the DCI may be used to schedule a plurality of transport blocks. In this case, semi-persistent scheduling is implemented. Power consumption of listening on a PDCCH by the terminal device can be reduced by using the DCI.

In addition, after the DCI is enabled, use of the DCI may be further suspended or new DCI may be re-enabled. For example, the network device may send first indication information to the terminal device. The first indication information is used to indicate that application of the DCI format is suspended, or used to indicate that a new DCI format is enabled. For example, the first indication information may be implemented by using RRC signaling or a MAC CE. In other words, the first indication information does not need to be carried on a PDCCH. In this case, the terminal device does not need to continuously listen on the PDCCH when the terminal device needs to listen to the first indication information, to further reduce power consumption of the terminal device.

The foregoing describes a solution for implementing semi-persistent scheduling. The following further describes another embodiment, and describes how the network device instructs the terminal device to release an RRC connection.

In the prior art, after the base station and the terminal device set up an RRC connection, if the RRC connection needs to be released, the network device sends RRC signaling to the terminal device, to instruct the terminal device to release the RRC connection. In this case, after releasing the RRC connection, the terminal device needs to send an RRC status report to the network device by using an uplink resource. However, the network device does not know that the terminal device needs to send the RRC status report to the network device. Therefore, the network device does not schedule the uplink resource for the terminal device. In this case, the terminal device needs to apply for the uplink resource to send the RRC status report. For example, a terminal device in an NB-IoT system may apply for the uplink resource in a random access process, and therefore power consumption is high. In view of this, this application provides an RRC connection release method, to effectively reduce power consumption of the terminal device.

Figure 6:
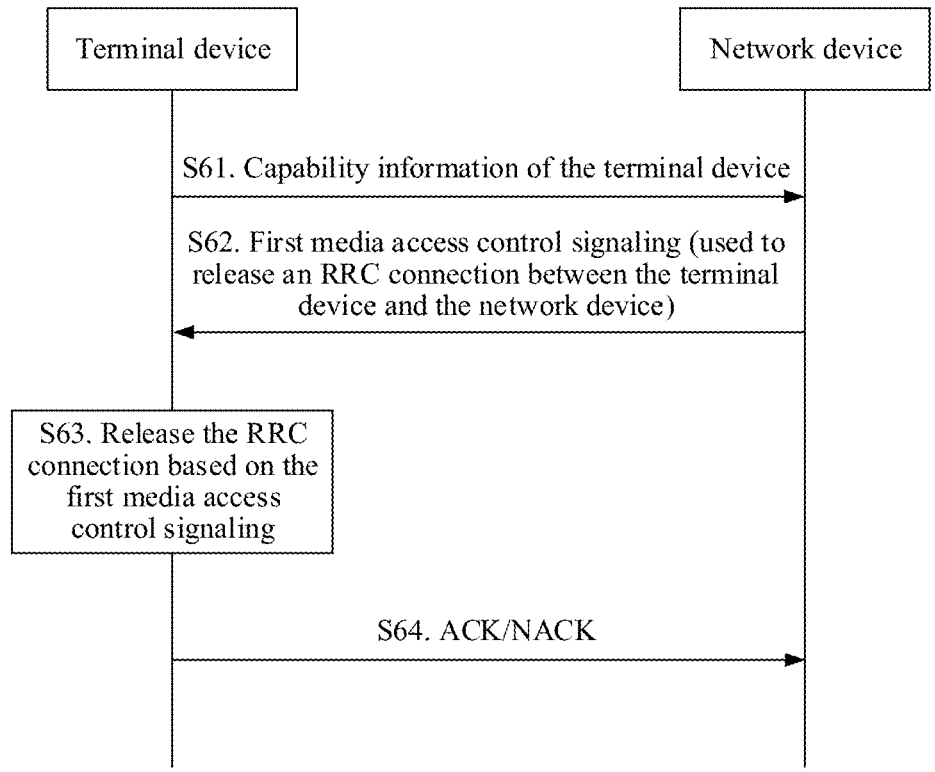
FIG. 6 is a flowchart of an RRC connection release method according to an embodiment of this application.

Referring to FIG. 6, a procedure of the method is described below. An example in which the method is applied to the application scenario shown in FIG. 2 continues to be used in the following description process.

S61. If a terminal device sends capability information of the terminal device to a network device, the network device receives the capability information of the terminal device that is sent by the terminal device.

The capability information of the terminal device may be used to indicate whether the terminal device supports the network device in using media access control (media access control, MAC) signaling to instruct the terminal device to release an RRC connection between the terminal device and the network device.

Alternatively, if the network device has obtained the capability information of the terminal device in advance, step S62 may be directly performed without a need to perform step S61. To be specific, the network device may alternatively obtain the capability information of the terminal device in another manner. For a specific obtaining manner, refer to the descriptions in step S51 in the embodiment shown in FIG. 5. Details are not described again.

S62. If the network device sends first media access control signaling to the terminal device, the terminal device receives the first media access control signaling. The first media access control signaling is used to instruct the terminal device to release the RRC connection between the terminal device and the network device.

If the capability information of the terminal device indicates that the terminal device supports the network device in using the MAC signaling to instruct the terminal device to release the RRC connection between the terminal device and the network device, when determining that the RRC connection between the network device and the terminal device needs to be released, the network device sends the first media access control signaling to the terminal device, to instruct the terminal device to release the RRC connection. For example, the first media access control signaling is a MAC CE.

S63. The terminal device releases the RRC connection based on the first media access control signaling.

After receiving the first media access control signaling, the terminal device may release the RRC connection between the terminal device and the network device based on the first media access control signaling.

S64. If the terminal device sends an acknowledgment (ACK) or a negative acknowledgment (NACK) to the network device, the network device receives the ACK or the NACK sent by the terminal device.

The ACK is used to indicate that the RRC connection is successfully released, and the NACK is used to indicate that the RRC connection fails to be released.

The terminal device generates an ACK or a NACK based on a result of releasing the RRC connection. If the RRC connection is successfully released, the terminal device generates the ACK, and sends the ACK to the network device; or if the RRC connection fails to be released, the terminal device generates the NACK, and sends the NACK to the network device.

It can be learned that the network device uses MAC signaling (namely, the first media access control signaling) to instruct the terminal device to release the RRC connection, instead of using RRC signaling for instruction. Therefore, the terminal device does not need to send an RRC status report to the network device. The ACK/NACK is MAC layer signaling, an uplink resource required by the MAC layer signaling is scheduled by the network device, and the terminal device may directly use the uplink resource without a need to apply for scheduling again. It can be learned that after the technical solution in this embodiment of this application is used, the terminal device does not need to apply to the network device for the uplink resource again, so that power consumption of the terminal device is reduced, and an entire procedure can also be simplified.

Devices provided in embodiments of this application are described below with reference to the accompanying drawings.

Figure 7:
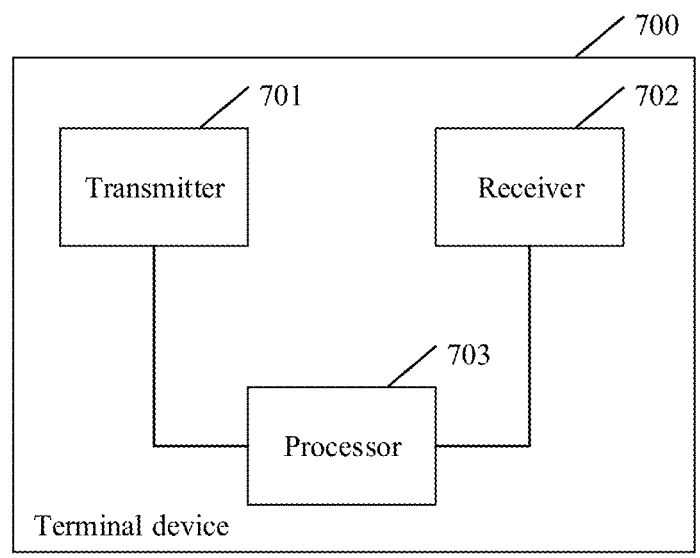
FIG. 7 is a schematic structural diagram of a terminal device according to an embodiment of this application.

FIG. 7 is a schematic structural diagram of a terminal device 700. The terminal device 700 may implement functions of the terminal device in the foregoing descriptions. The terminal device 700 may include a transmitter 701, a receiver 702, and a processor 703. The transmitter 701 may be configured to perform steps S32 and S35 in the embodiment shown in FIG. 3, and/or configured to support another process of the technology described in this specification. The receiver 702 may be configured to perform step S33 in the embodiment shown in FIG. 3, and/or configured to support another process of the technology described in this specification. The processor 703 may be configured to perform step S34 in the embodiment shown in FIG. 3, and/or configured to support another process of the technology described in this specification.

For example, the transmitter 701 is configured to apply to the network device for semi-persistent scheduling.

The receiver 702 is configured to: after the transmitter 701 applies to the network device for semi-persistent scheduling, receive configuration information sent by the network device. The configuration information is used to configure a first semi-persistent scheduling resource for the terminal device.

The processor 703 is configured to configure the first semi-persistent resource for the terminal device based on the configuration information received by the receiver 702.

The transmitter 701 is further configured to send uplink data to the network device on the first semi-persistent scheduling resource configured by the processor 703.

All related content of the steps in the foregoing method embodiments may be cited in function descriptions of corresponding function modules. Details are not described herein again.

Figure 8:
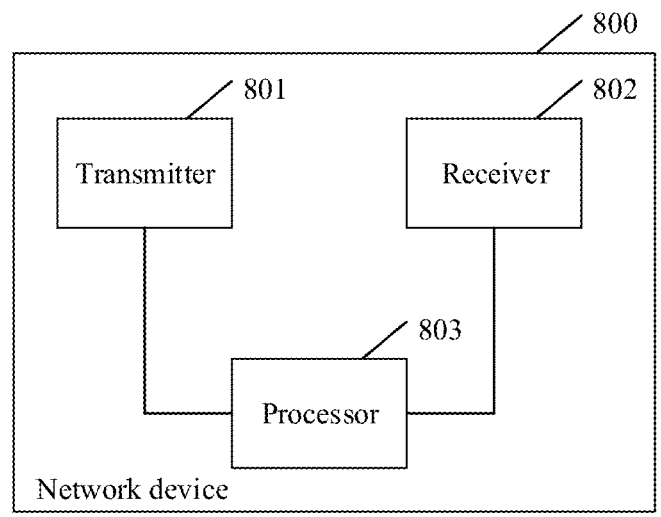
FIG. 8 is a schematic structural diagram of a network device according to an embodiment of this application.

FIG. 8 is a schematic structural diagram of a network device 800. The network device 800 may implement functions of the network device in the foregoing descriptions. The network device 800 may include a transmitter 801, a receiver 802, and a processor 803. The transmitter 801 may be configured to perform steps S31 and S33 in the embodiment shown in FIG. 3, and/or configured to support another process of the technology described in this specification. The receiver 802 may be configured to perform steps S32 and S35 in the embodiment shown in FIG. 3, and/or configured to support another process of the technology described in this specification. The processor 803 may be configured to perform step S32 in the embodiment shown in FIG. 3, and/or configured to support another process of the technology described in this specification.

For example, the processor 803 is configured to determine that the terminal device applies for semi-persistent scheduling.

The transmitter 801 is configured to: after the processor 803 determines that the terminal device applies for semi-persistent scheduling, send configuration information to the terminal device. The configuration information is used to configure a first semi-persistent scheduling resource for the terminal device.

The receiver 802 is configured to receive, on the first semi-persistent scheduling resource configured by using the configuration information sent by the transmitter 801, uplink data sent by the terminal device.

All related content of the steps in the foregoing method embodiments may be cited in function descriptions of corresponding function modules. Details are not described herein again.

Figure 9:
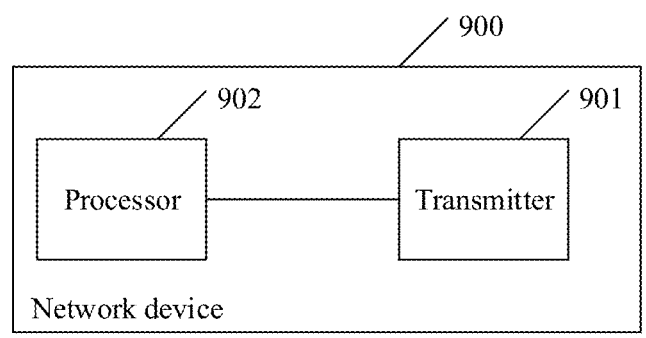
FIG. 9 is a schematic structural diagram of a network device according to an embodiment of this application.

FIG. 9 is a schematic structural diagram of a network device 900. The network device 900 may implement functions of the network device in the foregoing descriptions. The network device 900 may include a transmitter 901 and a processor 902. The transmitter 901 may be configured to perform steps S42 to S44 in the embodiment shown in FIG. 4 and steps S51, S53, and S54 in the embodiment shown in FIG. 5, and/or configured to support another process of the technology described in this specification. The processor 902 may be configured to: generate DCI format information, and obtain capability information of the terminal device and/or DCI format information supported by a service performed by the network device 900, and/or configured to support another process of the technology described in this specification.

For example, the processor 902 is configured to generate the DCI format information.

The transmitter 901 is configured to send the DCI format information generated by the processor 902. The DCI format information is used to indicate a DCI format used by the network device, and the DCI is used to schedule at least two transport blocks.

The transmitter 901 is further configured to send the DCI to the terminal device.

All related content of the steps in the foregoing method embodiments may be cited in function descriptions of corresponding function modules. Details are not described herein again.

Figure 10:
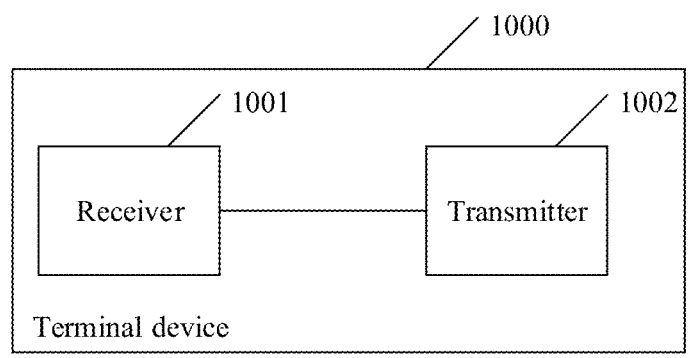
FIG. 10 is a schematic structural diagram of a terminal device according to an embodiment of this application.

FIG. 10 is a schematic structural diagram of a terminal device 1000. The terminal device 1000 may implement functions of the terminal device in the foregoing descriptions. The terminal device 1000 may include a receiver 1001. Optionally, the terminal device 1000 may further include a transmitter 1002. The receiver 1001 may be configured to perform steps S42 to S44 in the embodiment shown in FIG. 4 and steps S52, S53, and S54 in the embodiment shown in FIG. 5, and/or configured to support another process of the technology described in this specification. The transmitter 1002 may be configured to send capability information of the terminal device to the network device, and/or configured to support another process of the technology described in this specification.

For example, the receiver 1001 is configured to receive DCI format information sent by the network device. The DCI format information is used to indicate a DCI format used by the network device, and the DCI is used to schedule at least two transport blocks.

The receiver 1001 is further configured to receive the DCI sent by the network device.

The receiver 1001 is further configured to receive, based on scheduling of the DCI, downlink data sent by the network device.

All related content of the steps in the foregoing method embodiments may be cited in function descriptions of corresponding function modules. Details are not described herein again.

Figure 11:
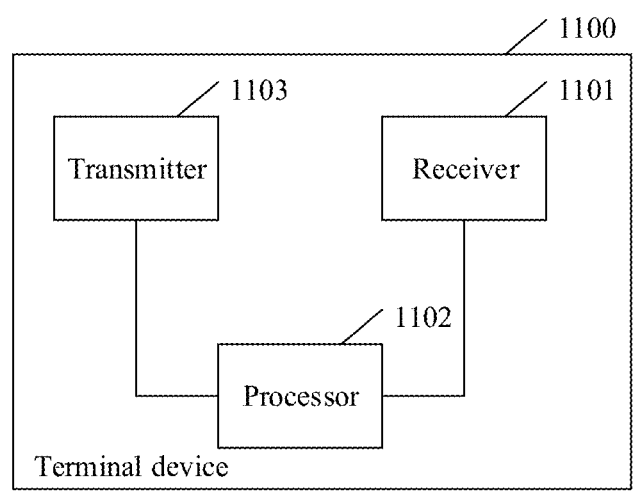
FIG. 11 is a schematic structural diagram of a terminal device according to an embodiment of this application.

FIG. 11 is a schematic structural diagram of a terminal device 1100. The terminal device 1100 may implement functions of the terminal device in the foregoing descriptions. The terminal device 1100 may include a receiver 1101 and a processor 1102. Optionally, the terminal device 1100 may further include a transmitter 1103. The receiver 1101 may be configured to perform step S62 in the embodiment shown in FIG. 6, and/or configured to support another process of the technology described in this specification. The processor 1102 may be configured to perform step S63 in the embodiment shown in FIG. 6, and/or configured to support another process of the technology described in this specification. The transmitter 1103 may be configured to perform steps S61 and S64 in the embodiment shown in FIG. 6, and/or configured to support another process of the technology described in this specification.

For example, the receiver 1101 is configured to receive first media access control signaling sent by the network device. The first media access control signaling is used to instruct the terminal device to release the RRC connection to the network device.

The processor 1102 is configured to release the RRC connection based on the first media access control signaling received by the receiver 1101.

All related content of the steps in the foregoing method embodiments may be cited in function descriptions of corresponding function modules. Details are not described herein again.

Figure 12:
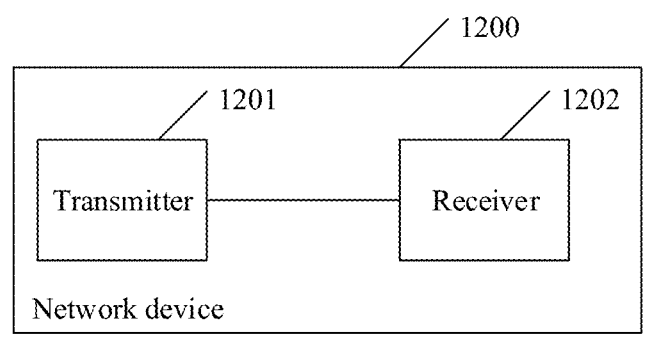
FIG. 12 is a schematic structural diagram of a network device according to an embodiment of this application.

FIG. 12 is a schematic structural diagram of a network device 1200. The network device 1200 may implement functions of the network device in the foregoing descriptions. The network device 1200 may include a transmitter 1201 and a receiver 1202. The transmitter 1201 may be configured to perform step S62 in the embodiment shown in FIG. 6, and/or configured to support another process of the technology described in this specification. The receiver 1202 may be configured to perform steps S61 and S64 in the embodiment shown in FIG. 6, and/or configured to support another process of the technology described in this specification.

For example, the transmitter 1201 is configured to send first media access control signaling to the terminal device. The first media access control signaling is used to instruct the terminal device to release the RRC connection to the network device.

The receiver 1202 is configured to receive an ACK or a NACK sent by the terminal device based on the first media access control signaling sent by the transmitter 1201. The ACK is used to indicate that the RRC connection is successfully released, and the NACK is used to indicate that the RRC connection fails to be released.

All related content of the steps in the foregoing method embodiments may be cited in function descriptions of corresponding function modules. Details are not described herein again.

In the embodiments of this application, the terminal device 700, the terminal device 1000, the terminal device 1100, the network device 800, the network device 900, and the network device 1200 are presented in a form in which function modules are obtained through division based on corresponding functions, or may be presented in a form in which function modules are obtained through division in an integrated manner. The "module" herein may be an application-specific integrated circuit (application-specific integrated circuit, ASIC), a processor and a memory for executing one or more software or firmware programs, an integrated logic circuit, and/or another device that can provide the foregoing functions.

Figure 13:
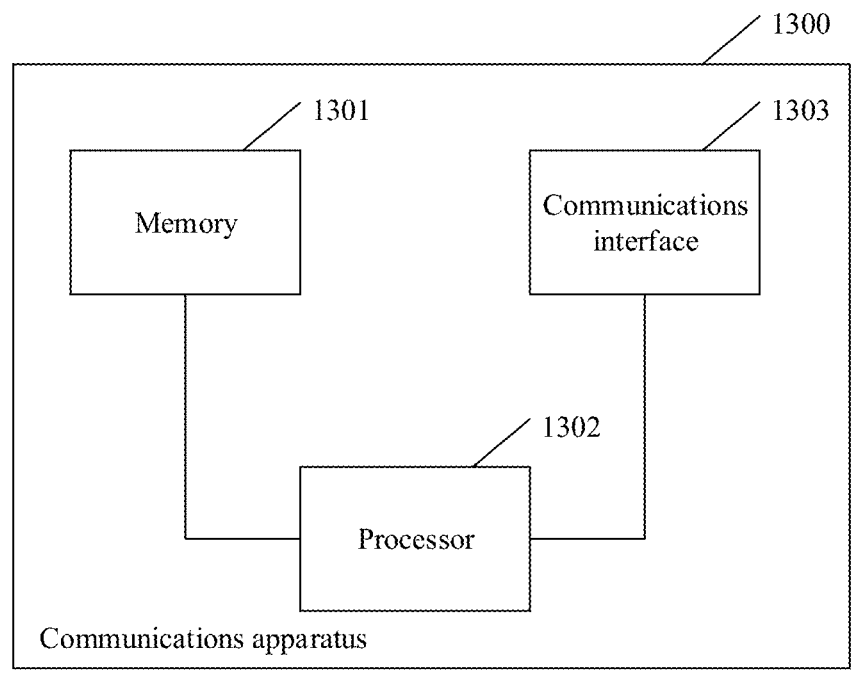
FIG. 13 is a schematic structural diagram of a communications apparatus according to an embodiment of this application.
Figure 14:
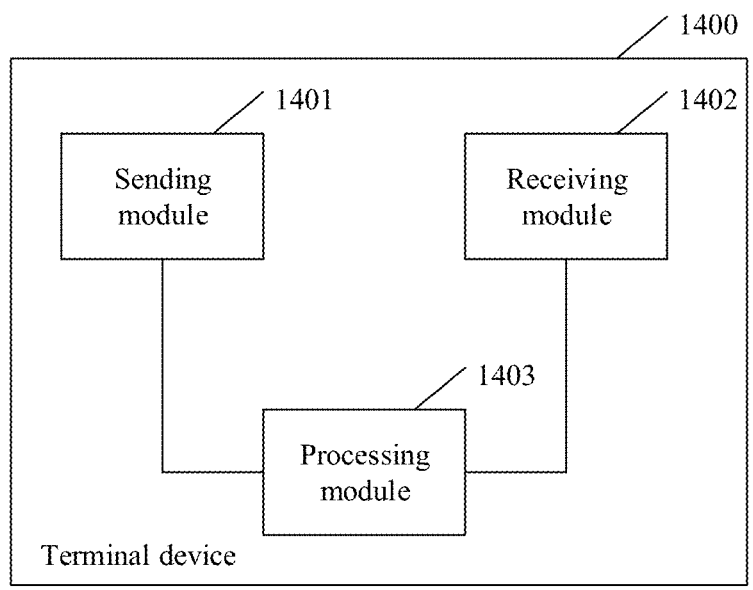
FIG. 14 is a schematic structural diagram of a terminal device according to an embodiment of this application.
Figure 15:
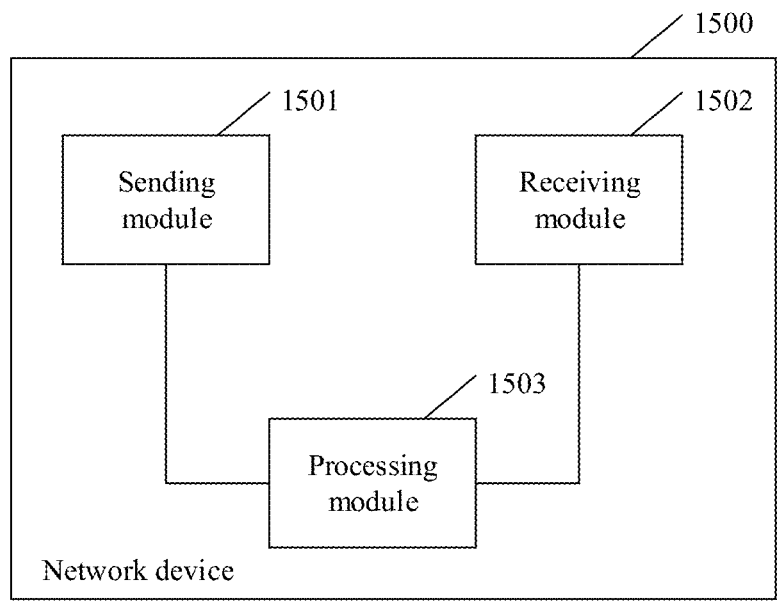
FIG. 15 is a schematic structural diagram of a network device according to an embodiment of this application.
Figure 16:
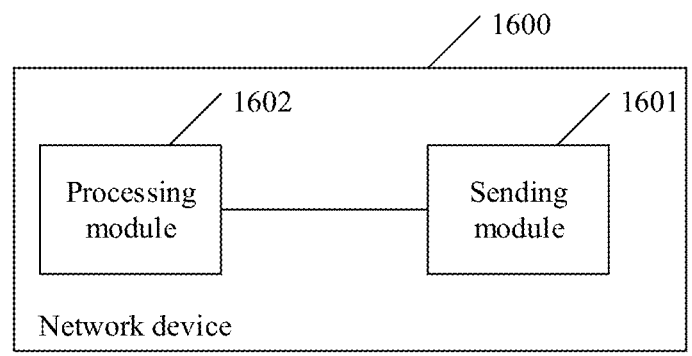
FIG. 16 is a schematic structural diagram of a network device according to an embodiment of this application.
Figure 17:
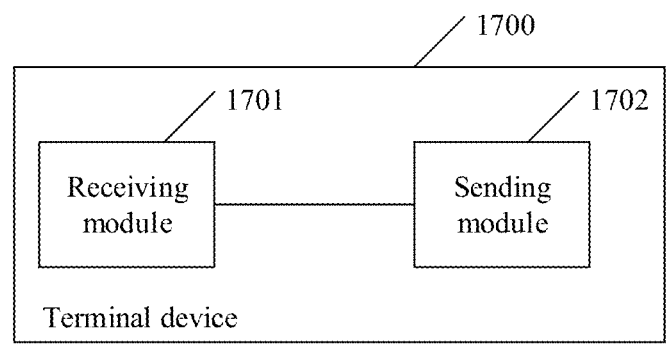
FIG. 17 is a schematic structural diagram of a terminal device according to an embodiment of this application.
Figure 18:
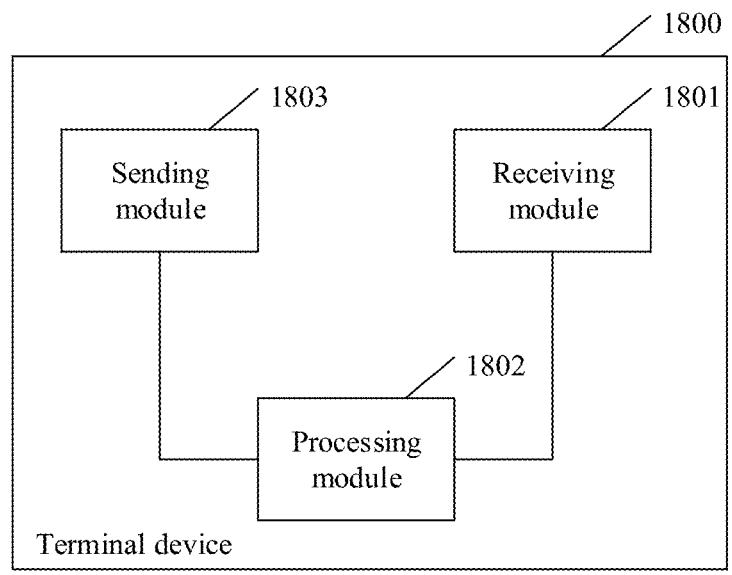
FIG. 18 is a schematic structural diagram of a terminal device according to an embodiment of this application.
Figure 19:
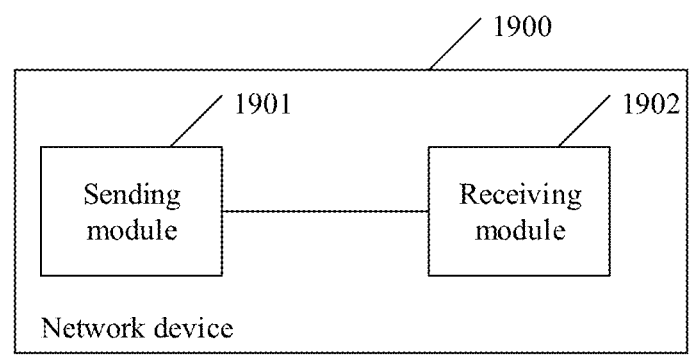
FIG. 19 is a schematic structural diagram of a network device according to an embodiment of this application.

In a simple embodiment, a person skilled in the art may figure out that the terminal device 700, the terminal device 1000, the terminal device 1100, the network device 800, the network device 900, or the network device 1200 may be further implemented by using a structure of a communications apparatus 1300 shown in FIG. 13.

As shown in FIG. 13, the communications apparatus 1300 may include a memory 1301, a processor 1302, and a communications interface 1303. The memory 1301 and the communications interface 1303 are connected to the processor 1302. The memory 1301 is configured to store a computer execution instruction. When the communications apparatus 1300 runs, the processor 1302 executes the computer execution instruction stored in the memory 1301, so that the communications apparatus 1300 performs the method provided in at least one of the embodiments shown in FIG. 3 to FIG. 6. For a specific method, refer to the foregoing descriptions and related descriptions in the accompanying drawings. Details are not described herein again. The communications interface 1303 may be implemented by using a transceiver, or implemented by using an independent receiver and transmitter.

In an example, the transmitter 701 and the receiver 702 may correspond to the communications interface 1303 in FIG. 13. The processor 703 may be built in or independent of the memory 1301 of the communications apparatus 1300 in a hardware/software form.

In an example, the transmitter 801 and the receiver 802 may correspond to the communications interface 1303 in FIG. 13. The processor 803 may be built in or independent of the memory 1301 of the communications apparatus 1300 in a hardware/software form.

In an example, the transmitter 901 may correspond to the communications interface 1303 in FIG. 13. The processor 902 may be built in or independent of the memory 1301 of the communications apparatus 1300 in a hardware/software form.

In an example, the receiver 1001 and the transmitter 1002 may correspond to the communications interface 1303 in FIG. 13.

In an example, the receiver 1101 may correspond to the communications interface 1303 in FIG. 13. The processor 1102 may be built in or independent of the memory 1301 of the communications apparatus 1300 in a hardware/software form.

In an example, the transmitter 1201 and the receiver 1202 may correspond to the communications interface 1303 in FIG. 13.

Optionally, the communications apparatus 1300 may be a field-programmable gate array (field-programmable gate array, FPGA), an application-specific integrated circuit (application specific integrated circuit, ASIC), a system-on-a-chip (system on chip, SoC), a central processing unit (central processor unit, CPU), a network processor (network processor, NP), a digital signal processing circuit (digital signal processor, DSP), or a microcontroller (micro controller unit, MCU), or may be a programmable controller (programmable logic device, PLD) or another integrated chip. Alternatively, the communications apparatus 1300 may be an independent network element, for example, the terminal device or the network device described above.

In addition, the terminal device provided in the embodiment shown in FIG. 7 may be further implemented in another form. For example, the terminal device 1400 includes a sending module 1401 and a receiving module 1402. The sending module 1401 may be configured to perform steps S32 and S35 in the embodiment shown in FIG. 3, and/or configured to support another process of the technology described in this specification. The receiving module 1402 may be configured to perform step S33 in the embodiment shown in FIG. 3, and/or configured to support another process of the technology described in this specification. A processing module 1403 may be configured to perform step S34 in the embodiment shown in FIG. 3, and/or configured to support another process of the technology described in this specification.

For example, the sending module 1401 is configured to apply to the network device for semi-persistent scheduling.

The receiving module 1402 is configured to: after the sending module 1401 applies to the network device for semi-persistent scheduling, receive configuration information sent by the network device. The configuration information is used to configure a first semi-persistent scheduling resource for the terminal device.

The processing module 1403 is configured to configure the first semi-persistent resource for the terminal device based on the configuration information received by the receiving module 1402.

The sending module 1401 is further configured to send uplink data to the network device on the first semi-persistent scheduling resource configured by the processing module 1403.

All related content of the steps in the foregoing method embodiments may be cited in function descriptions of corresponding function modules. Details are not described herein again.

The network device provided in the embodiment shown in FIG. 8 may be further implemented in another form. For example, the network device 1500 includes a sending module 1501, a receiving module 1502, and a processing module 1503. The sending module 1501 may be configured to perform steps S31 and S33 in the embodiment shown in FIG. 3, and/or configured to support another process of the technology described in this specification. The receiving module 1502 may be configured to perform steps S32 and S35 in the embodiment shown in FIG. 3, and/or configured to support another process of the technology described in this specification. The processing module 1503 may be configured to perform step S32 in the embodiment shown in FIG. 3, and/or configured to support another process of the technology described in this specification.

For example, the processing module 1503 is configured to determine that the terminal device applies for semi-persistent scheduling.

The sending module 1501 is configured to: after the processing module 1503 determines that the terminal device applies for semi-persistent scheduling, send configuration information to the terminal device. The configuration information is used to configure a first semi-persistent scheduling resource for the terminal device.

The receiving module 1502 is configured to receive, on the first semi-persistent scheduling resource configured by using the configuration information sent by the sending module 1501, uplink data sent by the terminal device.

All related content of the steps in the foregoing method embodiments may be cited in function descriptions of corresponding function modules. Details are not described herein again.

The network device provided in the embodiment shown in FIG. 9 may be further implemented in another form. For example, the network device 1600 includes a sending module 1601 and a processing module 1602. The sending module 1601 may be configured to perform steps S42 to S44 in the embodiment shown in FIG. 4 and steps S51, S53, and S54 in the embodiment shown in FIG. 5, and/or configured to support another process of the technology described in this specification. The processing module 1602 may be configured to: generate DCI format information, and obtain capability information of the terminal device and/or DCI format information supported by a service performed by the network device 1600, and/or configured to support another process of the technology described in this specification.

For example, the processing module 1602 is configured to generate the DCI format information.

The sending module 1601 is configured to send the DCI format information generated by the processing module 1602. The DCI format information is used to indicate a DCI format used by the network device, and the DCI is used to schedule at least two transport blocks.

The sending module 1601 is configured to send the DCI to the terminal device.

All related content of the steps in the foregoing method embodiments may be cited in function descriptions of corresponding function modules. Details are not described herein again.

The terminal device provided in the embodiment shown in FIG. 10 may be further implemented in another form. For example, the terminal device 1700 includes a receiving module 1701. Optionally, the terminal device 1700 may further include a sending module 1702. The receiving module 1701 may be configured to perform steps S42 to S44 in the embodiment shown in FIG. 4 and steps S52, S53, and S54 in the embodiment shown in FIG. 5, and/or configured to support another process of the technology described in this specification. The sending module 1702 may be configured to send capability information of the terminal device to the network device, and/or configured to support another process of the technology described in this specification.

For example, the receiving module 1701 is configured to receive DCI format information sent by the network device. The DCI format information is used to indicate a DCI format used by the network device, and the DCI is used to schedule at least two transport blocks.

The receiving module 1701 is further configured to receive the DCI sent by the network device.

The receiving module 1701 is further configured to receive, based on scheduling of the DCI, downlink data sent by the network device.

All related content of the steps in the foregoing method embodiments may be cited in function descriptions of corresponding function modules. Details are not described herein again.

The terminal device provided in the embodiment shown in FIG. 11 may be further implemented in another form. For example, the terminal device 1800 includes a receiving module 1801 and a processing module 1802. Optionally, the terminal device 1800 may further include a sending module 1803. The receiving module 1801 may be configured to perform step S62 in the embodiment shown in FIG. 6, and/or configured to support another process of the technology described in this specification. The processing module 1802 may be configured to perform step S63 in the embodiment shown in FIG. 6, and/or configured to support another process of the technology described in this specification. The sending module 1803 may be configured to perform steps S61 and S64 in the embodiment shown in FIG. 6, and/or configured to support another process of the technology described in this specification.

For example, the receiving module 1801 is configured to receive first media access control signaling sent by the network device. The first media access control signaling is used to instruct the terminal device to release the RRC connection to the network device.

The processing module 1802 is configured to release the RRC connection based on the first media access control signaling received by the receiving module 1801.

All related content of the steps in the foregoing method embodiments may be cited in function descriptions of corresponding function modules. Details are not described herein again.

The network device provided in the embodiment shown in FIG. 12 may be further implemented in another form. For example, the network device 1900 includes a sending module 1901 and a receiving module 1902. The sending module 1901 may be configured to perform step S62 in the embodiment shown in FIG. 6, and/or configured to support another process of the technology described in this specification. The receiving module 1902 may be configured to perform steps S61 and S64 in the embodiment shown in FIG. 6, and/or configured to support another process of the technology described in this specification.

For example, the sending module 1901 is configured to send first media access control signaling to the terminal device. The first media access control signaling is used to instruct the terminal device to release the RRC connection to the network device.

The receiving module 1902 is configured to receive an ACK or a NACK sent by the terminal device based on the first media access control signaling sent by the sending module 1901. The ACK is used to indicate that the RRC connection is successfully released, and the NACK is used to indicate that the RRC connection fails to be released.

All related content of the steps in the foregoing method embodiments may be cited in function descriptions of corresponding function modules. Details are not described herein again.

The terminal device 700, the network device 800, the communications apparatus 1300, the terminal device 1400, and the network device 1500 that are provided in the embodiments of this application may be configured to perform the method provided in the embodiment shown in FIG. 3, the terminal device 1000, the network device 900, the communications apparatus 1300, the terminal device 1700, and the network device 1600 may be configured to perform the method provided in at least one of the embodiments shown in FIG. 4 and FIG. 5, and the terminal device 1100, the network device 1200, the communications apparatus 1300, the terminal device 1800, and the network device 1900 may be configured to perform the method provided in the embodiment shown in FIG. 6. Therefore, for technical effects that can be achieved by the devices, refer to the foregoing method embodiments. Details are not described herein again.

A person skilled in the art may further understand that various illustrative logical blocks (illustrative logic block) and steps (step) that are listed in the embodiments of this application may be implemented by using electronic hardware, computer software, or a combination thereof. Whether the functions are implemented by using hardware or software depends on particular applications and a design requirement of an entire system. A person skilled in the art may use various methods to implement the described functions for each particular application, but it should not be considered that the implementation goes beyond the protection scope of the embodiments of this application.

The various illustrative logical units and circuits described in the embodiments of this application may implement or operate the described functions by using a general purpose processor, a digital signal processor, an ASIC, an FPGA or another programmable logical apparatus, a discrete gate or transistor logic, a discrete hardware component, or a design of any combination thereof. The general purpose processor may be a microprocessor. Optionally, the general purpose processor may alternatively be any conventional processor, controller, microcontroller, or state machine. The processor may alternatively be implemented by a combination of computing apparatuses, such as a digital signal processor and a microprocessor, a plurality of microprocessors, one or more microprocessors with a digital signal processor core, or any other similar configuration.

Steps of the methods or algorithms described in the embodiments of this application may be directly embedded into hardware, a software unit executed by a processor, or a combination thereof. The software unit may be stored in a RAM memory, a flash memory, a ROM memory, an EPROM memory, an EEPROM memory, a register, a hard disk, a removable magnetic disk, a CD-ROM, or a storage medium of any other form in the art. For example, the storage medium may connect to a processor, so that the processor can read information from the storage medium and write information to the storage medium. Optionally, the storage medium may alternatively be integrated into the processor. The processor and the storage medium may be disposed in an ASIC, and the ASIC may be disposed in UE. Optionally, the processor and the storage medium may alternatively be disposed in different components of the UE.

It should be understood that sequence numbers of the processes do not mean execution sequences in various embodiments of this application. The execution sequences of the processes should be determined based on functions and internal logic of the processes, and should not be construed as any limitation on the implementation processes of the embodiments of this application.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, the procedure or functions according to the embodiments of this application are completely or partially generated. The computer may be a general-purpose computer, a dedicated computer, a computer network, or another programmable apparatus. The computer instructions may be stored in a computer readable storage medium, or may be transmitted from a computer readable storage medium to another computer readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk solid state disk (SSD)), or the like.

The parts in this specification are all described in a progressive manner. For same or similar parts in the embodiments, mutual reference may be made to each other. Each embodiment focuses on a difference from another embodiment. Especially, apparatus and system embodiments are basically similar to the method embodiments, and therefore are described briefly. For related parts, refer to partial descriptions in the method embodiments.

According to the foregoing description of this specification in this application, technologies in the art may use or implement the content of this application. Any modification based on the disclosed content shall be considered obvious in the art. The basic principles described in this application may be applied to other variations without departing from the essence and scope of this application. Therefore, the content disclosed in this application is not limited to the described embodiments and designs, but may also be extended to a maximum scope that is consistent with the principles and disclosed new features of this application.

What is claimed is:

1. A resource configuration method, comprising:
applying, by a terminal device and to a network device, for semi-persistent scheduling;
receiving, by the terminal device, configuration information sent by the network device, wherein the configuration information is used to configure a first semi-persistent scheduling resource for the terminal device;
configuring, by the terminal device, the first semi-persistent resource for the terminal device based on the configuration information; and
sending, by the terminal device, uplink data to the network device on the first semi-persistent scheduling resource.

2. The method according to claim 1, wherein before the applying, by a terminal device and to a network device, for semi-persistent scheduling, the method further comprises:
receiving, by the terminal device, a broadcast message sent by the network device, wherein the broadcast message is used to indicate that the network device supports semi-persistent scheduling, or wherein the broadcast message is used to indicate a random access resource reserved by the network device for the terminal device to apply for semi-persistent scheduling.

3. The method according to claim 2, wherein the applying, by a terminal device and to a network device, for semi-persistent scheduling comprises:
when the broadcast message is used to indicate that the network device supports semi-persistent scheduling, sending, by the terminal device, semi-persistent scheduling request information to the network device by using first radio resource control (RRC) signaling, wherein the semi-persistent scheduling request information is used to apply for semi-persistent scheduling; or
when the broadcast message is used to indicate the random access resource reserved by the network device for the terminal device to apply for semi-persistent scheduling, sending, by the terminal device, a random access preamble to the network device by using a first random access resource in the reserved random access resource.

4. The method according to claim 2, wherein:
when the broadcast message is used to indicate that the network device supports semi-persistent scheduling, the broadcast message is further used to indicate a coverage level that is of semi-persistent scheduling and that is supported by the network device, and wherein the method further comprises:
determining, by the terminal device based on a coverage level of the terminal device and the coverage level that is of semi-persistent scheduling and that is supported by the network device, whether to apply for semi-persistent scheduling; or
when the broadcast message is used to indicate the random access resource reserved by the network device for the terminal device to apply for semi-persistent scheduling, the broadcast message is further used to indicate a coverage level that is of semi-persistent scheduling and that corresponds to the reserved random access resource, and wherein the method further comprises:
determining, by the terminal device based on a coverage level of the terminal device and the coverage level that is of semi-persistent scheduling and that corresponds to the reserved random access resource, whether to apply for semi-persistent scheduling.

5. The method according to claim 1, wherein the receiving, by the terminal device, configuration information sent by the network device comprises:
receiving, by the terminal device, second RRC signaling sent by the network device, wherein the second RRC signaling carries the configuration information, and wherein the configuration information is further used to activate the first semi-persistent scheduling resource.

6. The method according to claim 1, wherein the configuration information is used to indicate at least one of a scheduling period of the first semi-persistent resource, a quantity of repeated transmission times, a modulation and coding scheme used on the first semi-persistent scheduling resource, or a transport block size used on the first semi-persistent scheduling resource, and wherein the quantity of repeated transmission times is used to indicate a quantity of times of repeated transmission on the first semi-persistent scheduling resource.

7. The method according to claim 1, wherein the method further comprises:
receiving, by the terminal device, first indication information sent by the network device by using media access control signaling, wherein the first indication information is used to indicate that scheduling of the first semi-persistent scheduling resource is stopped.

8. The method according to claim 1, wherein the method further comprises:
receiving, by the terminal device, second indication information sent by the network device by using third RRC signaling, wherein the second indication information is used to configure a second semi-persistent scheduling resource for the terminal device, or wherein the second indication information is used to release the first semi-persistent scheduling resource, and wherein the second semi-persistent scheduling resource is used by the terminal device to send uplink data to the network device.

9. A communication apparatus, comprising:
at least one processor; and
a memory storing instructions executable by the at least one processor, wherein the instructions, when executed by the at least one processor, instruct the at least one processor to:
apply to a network device for semi-persistent scheduling;
applying to the network device for semi-persistent scheduling, receive configuration information sent by the network device, wherein the configuration information is used to configure a first semi-persistent scheduling resource for the communication apparatus;
configure the first semi-persistent resource for the communication apparatus based on the received configuration information; and
send uplink data to the network device on the first semi-persistent scheduling resource.

10. The communication apparatus according to claim 9, wherein the instructions further instruct the at least one processor to:
receive a broadcast message sent by the network device, wherein the broadcast message is used to indicate that the network device supports semi-persistent scheduling, or wherein the broadcast message is used to indicate a random access resource reserved by the network device for the communication apparatus to apply for semi-persistent scheduling.

11. The communication apparatus according to claim 10, wherein the instructions further instruct the at least one processor to:
when the broadcast message is used to indicate that the network device supports semi-persistent scheduling, send semi-persistent scheduling request information to the network device by using first radio resource control (RRC) signaling, wherein the semi-persistent scheduling request information is used to apply for semi-persistent scheduling; or
when the broadcast message is used to indicate the random access resource reserved by the network device for the communication apparatus to apply for semi-persistent scheduling, send a random access preamble to the network device by using a first random access resource in the reserved random access resource.

12. The communication apparatus according to claim 10, wherein the instructions further instruct the at least one processor to:
when the broadcast message is used to indicate that the network device supports semi-persistent scheduling, and when the broadcast message is further used to indicate a coverage level that is of semi-persistent scheduling and that is supported by the network device, determine, based on a coverage level of the communication apparatus and the coverage level that is of semi-persistent scheduling and that is supported by the network device, whether to apply for semi-persistent scheduling; or
when the broadcast message is used to indicate the random access resource reserved by the network device for the communication apparatus to apply for semi-persistent scheduling, and when the broadcast message is further used to indicate a coverage level that is of semi-persistent scheduling and that corresponds to the reserved random access resource, determine, based on a coverage level of the communication apparatus and the coverage level that is of semi-persistent scheduling and that corresponds to the reserved random access resource, whether to apply for semi-persistent scheduling.

13. The apparatus according to claim 9, wherein the instructions further instruct the at least one processor to:
receive second RRC signaling sent by the network device, wherein the second RRC signaling carries the configuration information, and wherein the configuration information is further used to activate the first semi-persistent scheduling resource.

14. The apparatus according to claim 9, wherein the configuration information is used to indicate at least one of a scheduling period of the first semi-persistent resource, a quantity of repeated transmission times, a modulation and coding scheme used on the first semi-persistent scheduling resource, or a transport block size used on the first semi-persistent scheduling resource, and wherein the quantity of repeated transmission times is used to indicate a quantity of times of repeated transmission on the first semi-persistent scheduling resource.

15. The apparatus according to claim 9, wherein the instructions further instruct the at least one processor to:
receive first indication information sent by the network device by using media access control signaling, wherein the first indication information is used to indicate that scheduling of the first semi-persistent scheduling resource is stopped.

16. The communication apparatus according to a claim 9, wherein the instructions further instruct the at least one processor to:
receive second indication information sent by the network device by using third RRC signaling, wherein the second indication information is used to configure a second semi-persistent scheduling resource for the communication apparatus, or wherein the second indication information is used to release the first semi-persistent scheduling resource, and wherein the second semi-persistent scheduling resource is used by the communication apparatus to send uplink data to the network device.

17. A non-transitory computer readable medium storing program codes for use by a terminal device for resource configuration, wherein the program codes comprise instructions instructing the terminal device to perform operations comprising:
applying to a network device for semi-persistent scheduling;
receiving configuration information sent by the network device, wherein the configuration information is used to configure a first semi-persistent scheduling resource for the terminal device;
configuring the first semi-persistent resource for the terminal device based on the configuration information; and
sending uplink data to the network device on the first semi-persistent scheduling resource.

* * * * *

UNITED STATES PATENT AND TRADEMARK OFFICE
CERTIFICATE OF CORRECTION

| | |
|---|---|
| PATENT NO. | : 11,405,977 B2 |
| APPLICATION NO. | : 16/786022 |
| DATED | : August 2, 2022 |
| INVENTOR(S) | : Baokun Shan, Yinghui Yu and Odile Rollinger |

It is certified that error appears in the above-identified patent and that said Letters Patent is hereby corrected as shown below:

In the Claims

Column 38 / Line 47 – In Claim 9, delete "applying" and insert -- after applying --.

Signed and Sealed this
Twenty-fifth Day of April, 2023

Katherine Kelly Vidal
*Director of the United States Patent and Trademark Office*